(12) United States Patent
Gupta

(10) Patent No.: US 7,860,193 B2
(45) Date of Patent: Dec. 28, 2010

(54) COARSE TIMING ESTIMATION SYSTEM AND METHODOLOGY FOR WIRELESS SYMBOLS

(75) Inventor: Alok Kumar Gupta, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 925 days.

(21) Appl. No.: 11/020,411

(22) Filed: Dec. 22, 2004

(65) Prior Publication Data

US 2006/0018413 A1 Jan. 26, 2006

Related U.S. Application Data

(60) Provisional application No. 60/589,898, filed on Jul. 20, 2004.

(51) Int. Cl.
*H04L 27/06* (2006.01)
(52) U.S. Cl. ...................................................... 375/340
(58) Field of Classification Search .................. 375/316, 375/340, 341, 346, 343, 354, 260, 259
See application file for complete search history.

(56) References Cited

U.S. PATENT DOCUMENTS

| 7,489,751 | B2 * | 2/2009 | Ruprich et al. | 375/354 |
| 2002/0064213 | A1 * | 5/2002 | Hasegawa | 375/150 |
| 2003/0043889 | A1 * | 3/2003 | Kang et al. | 375/147 |
| 2004/0005018 | A1 * | 1/2004 | Zhu et al. | 375/340 |

FOREIGN PATENT DOCUMENTS

| WO | WO 00/77961 A1 | 12/2000 |
| WO | WO 2004/008706 A2 | 1/2004 |
| WO | WO 2004025856 A1 * | 3/2004 |

* cited by examiner

*Primary Examiner*—Kevin M Burd
(74) *Attorney, Agent, or Firm*—Sandip S. Minhas; Gerald P. Joyce, III

(57) ABSTRACT

A system that facilitates obtaining a coarse estimation of a boundary of symbol with respect to time comprises a peak detector that detects a peak energy of an energy distribution output by a correlator, and an estimating component that adaptively estimates a boundary of the symbol based as a function of the detected peak energy. A parameter defined as a function of the magnitude to create a threshold value, the estimate obtained as a function of a comparison of the threshold with the energy distribution.

62 Claims, 23 Drawing Sheets

COARSE TIMING ESTIMATION SYSTEM AND METHODOLOGY FOR WIRELESS SYMBOLS

REFERENCE TO RELATED APPLICATION

This application claims the benefit of U.S. Provisional Application Ser. No. 60/589,898 filed on Jul. 20, 2004, and ACQUISITION FOR MEDIAFLO-PERFORMANCE AND COMPLEXITY ANALYSIS, the entirety of which is incorporated herein by reference.

BACKGROUND

I. Field

The following description relates generally to wireless communications, and more particularly to generating a coarse estimate of a symbol boundary with respect to time.

II. Background

In the not too distant past mobile communication devices in general, and mobile telephones in particular, were luxury items only affordable to those with substantial income. Further, these mobile telephones were of substantial size, rendering them inconvenient for extended portability. For example, in contrast to today's mobile telephones (and other mobile communication devices), mobile telephones of the recent past could not be placed into a user's pocket or handbag without causing such user extreme discomfort. In addition to deficiencies associated with mobile telephones, wireless communications networks that provided services for such telephones were unreliable, covered insufficient geographical areas, were associated with inadequate bandwidth, and various other deficiencies.

In contrast to the above-described mobile telephones, mobile telephones and other devices that utilize wireless networks are now commonplace. Today's mobile telephones are extremely portable and inexpensive. For example, a typical modern mobile telephone can easily be placed in a handbag without a carrier thereof noticing the existence of the telephone. Furthermore, wireless service providers often offer sophisticated mobile telephones at little to no cost to persons who subscribe to their wireless service. Numerous towers that transmit and/or relay wireless communications have been constructed over the last several years, thus providing wireless coverage to significant portions of the United States (as well as several other countries). Accordingly, millions (if not billions) of individuals own and utilize mobile telephones.

The aforementioned technological advancements are not limited solely to mobile telephones, as data other than voice data can be received and transmitted by devices equipped with wireless communication hardware and software. For instance, several major metropolitan areas have implemented or are planning to implement citywide wireless networks, thereby enabling devices with wireless capabilities to access a network (e.g., the Internet) and interact with data resident upon such network. Moreover, data can be exchanged between two or more devices by way of a wireless network. Given expected continuing advancement in technology, the number of users, devices, and data types exchanged wirelessly can be expected to continuously increase at a rapid rate.

Communication systems are widely deployed to provide various communication services such as voice, packet data, and so on. These systems may be time, frequency, and/or code division multiple-access systems capable of supporting communication with multiple users simultaneously by sharing the available system resources. Examples of such multiple-access systems include Code Division Multiple Access (CDMA) systems, Multiple-Carrier CDMA (MC-CDMA), Wideband CDMA (W-CDMA), High-Speed Downlink Packet Access (HSDPA), Time Division Multiple Access (TDMA) systems, Frequency Division Multiple Access (FDMA) systems, and Orthogonal Frequency Division Multiple Access (OFDMA) systems.

Orthogonal Frequency Division Multiplexing (OFDM) or Orthogonal Frequency Division Multiple Access (OFDMA) are exemplary protocols that are currently utilized in wireless environments to transmit and receive data. OFDM modulates digital information onto an analog carrier electromagnetic signal, and is utilized in an IEEE 802.11a/g WLAN standard, 802.16, and 802.20. An OFDM base band signal (e.g., a subband) is a sum of a number of orthogonal sub-carriers, where each sub-carrier is independently modulated by its own data. Benefits of OFDM over other conventional wireless communication protocols include ease of filtering noise, ability to vary upstream and downstream speeds (which can be accomplished by way of allocating more or fewer carriers for each purpose), ability to mitigate effects of frequency-selective fading, etc.

To effectively employ OFDM as a communications protocol, a boundary between symbols in an OFDM environment often needs to be determined. Such symbols include a plurality of samples as well as a cyclic prefix. The cyclic prefix, for example, can be located at a portion of a symbol first in time, and can include samples that exist within the symbol last in time. Thus, a boundary between symbols that include cyclic prefixes can be determined by locating a cyclic prefix within wireless symbols. A correlating component (e.g., a cross-correlator, an autocorrelator, a delay correlator, . . . ) correlates the cyclic prefix with samples within the symbol substantially similar thereto and determines a correlation in energy therebetween. A peak energy level output by the correlating component is indicative of a boundary of a symbol that can be employed in a wireless environment, and thereafter a fast Fourier transform can be applied to samples in a symbol delivered next in time. If multi-path effects were not an issue and no noise existed upon such channel, the peak energy output by the correlating component could be utilized to precisely determine a boundary between symbols adjacent in time.

Channels, however, are frequently associated with various noise, thus rendering it more difficult to determine location of a peak energy level output by a correlating component. Further, often channels are subject to a multi-path effect, wherein disparate portions of a symbol are delivered over different physical paths (or substantially similar portions of a signal are delivered over disparate physical paths), which can cause delay with respect to a receiver obtaining a plurality of samples. Thus, output of a correlator can produce a heightened flat energy level that does not include a peak corresponding to a boundary between symbols in a wireless network (e.g., OFDM, OFDMA, . . . ). Moreover, when noise accumulates on a channel, accurately determining a boundary between symbols based upon a peak can be difficult. In particular, if there is substantial disparity with respect to location in time of an energy peak output by the correlating component and location of a boundary, errors can result, thereby compromising network performance. In an attempt to alleviate such errors, conventional systems utilize a pre-defined time measurement and utilize such measurement to estimate the aforementioned boundary. In particular, a coarse estimate of a boundary between symbols is obtained by traversing backwards in time from an occurrence of a peak energy level (as output by the correlating component) the pre-defined amount of time. Such a methodology is adequate when a channel is not subject to noise and/or severe multi-path effects. During instances that a channel is associated with substantial noise, this approach can result in error that renders adequate obtainment of a coarse timing estimate between symbols problematic.

In view of at least the above, there exists a need in the art for a system and/or methodology obtaining an improved coarse estimation of a boundary between wireless symbols with respect to time.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

One or more embodiments include a plurality of systems/methodologies for obtaining improved coarse timing estimates with respect to symbols in wireless networking environments (e.g., OFDM, OFDMA, ... ). To facilitate optimal communications, a receiver should have an ability to precisely determine a boundary between disparate symbols. If there is error in such timing estimate, then substantial demodulation errors can result, thus reducing performance and increasing user frustration. One embodiment utilizes a cyclic prefix correlator to generate a correlation metric with respect to a symbol in a wireless environment. In a noiseless channel, a peak of the correlation metric (e.g., a peak of an energy distribution indicative of similarity between samples) will directly correspond to a boundary of the symbol. In a channel subject to multi-path effects, however, due to timing delays and noise, a peak of such correlation metric (e.g., a point in time that a greatest energy level exists) will not precisely correspond to a boundary of the symbol.

To obtain an improved coarse estimate of the boundary of the symbol, an adaptive technique is employed. More specifically, rather than utilizing a fixed time and performing a fixed "back off" from the peak (and labeling a result of such back off as a coarse estimate), an adaptive "back off" technique is employed. For example, a magnitude of the correlation metric at the peak can be stored and used in connection with generating a coarse estimate. In other words, a coarse estimation can be determined as a function of a determined peak magnitude. In one example, a parameter (between 0.5 and 1) can be defined and multiplied with the stored magnitude of the peak. A result of such multiplication can be utilized as a threshold, and the threshold is adaptive as peak magnitudes can alter given disparate channel conditions, disparate symbols, etc. The threshold is compared with correlator metrics, and a coarse timing estimate with respect to a boundary of the OFDM symbol is acquired as a function of the comparison. For instance, an energy distribution output by the cyclic prefix correlator can be compared with the determined threshold. A first point in time prior to occurrence of the peak energy level that the threshold is substantially similar to an energy output by the correlator can be defined as a coarse timing estimate with respect to a boundary of the symbol, wherein the symbol can be an OFDM symbol, an OFDMA symbol, or any other suitable symbol that can be employed in a wireless environment.

In accordance with another exemplary embodiment, a time window can be defined, wherein a coarse timing estimate is required to be within the time window. For instance, an energy distribution output by cyclic prefix correlator can be compared with a generated threshold as a function of a magnitude of a peak of the energy distribution. A time corresponding to where the threshold is first substantially similar to the energy distribution prior to occurrence of the peak, however, can lie outside the defined time window. Upon such an occurrence, a parameter utilized in connection with generating the threshold can be altered. For example, an algorithm can be utilized to alter the parameter, and thus alter the threshold. Moreover, both the parameter and the time window can be defined based upon channel condition estimates, previous performance, and the like. For example, the time window can be expanded during instances of high data volume to ensure that the coarse timing estimate is located quickly. Similarly, the parameter can be defined to be a greater value during instances of increased noise, and defined to be a lesser value during instances of greater path delay.

In another aspect, a method for generating an estimate for a location of a boundary of a symbol with respect to time is described herein. The method comprises receiving a symbol and performing a correlation with respect to the symbol. Thereafter, a peak energy with respect to the correlation is determined and a magnitude value with respect to such located peak energy is determined. The estimate of the boundary is determined as a function of the magnitude of the peak energy.

In yet another aspect, a system that facilitates obtaining a coarse estimation of a boundary of a symbol with respect to time is described herein. The system comprises a peak detector that detects a peak energy of an energy distribution output by a correlator. An estimating component adaptively estimates a boundary of the symbol as a function of a magnitude of the detected peak energy.

To the accomplishment of the foregoing and related ends, the one or more embodiments comprises the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
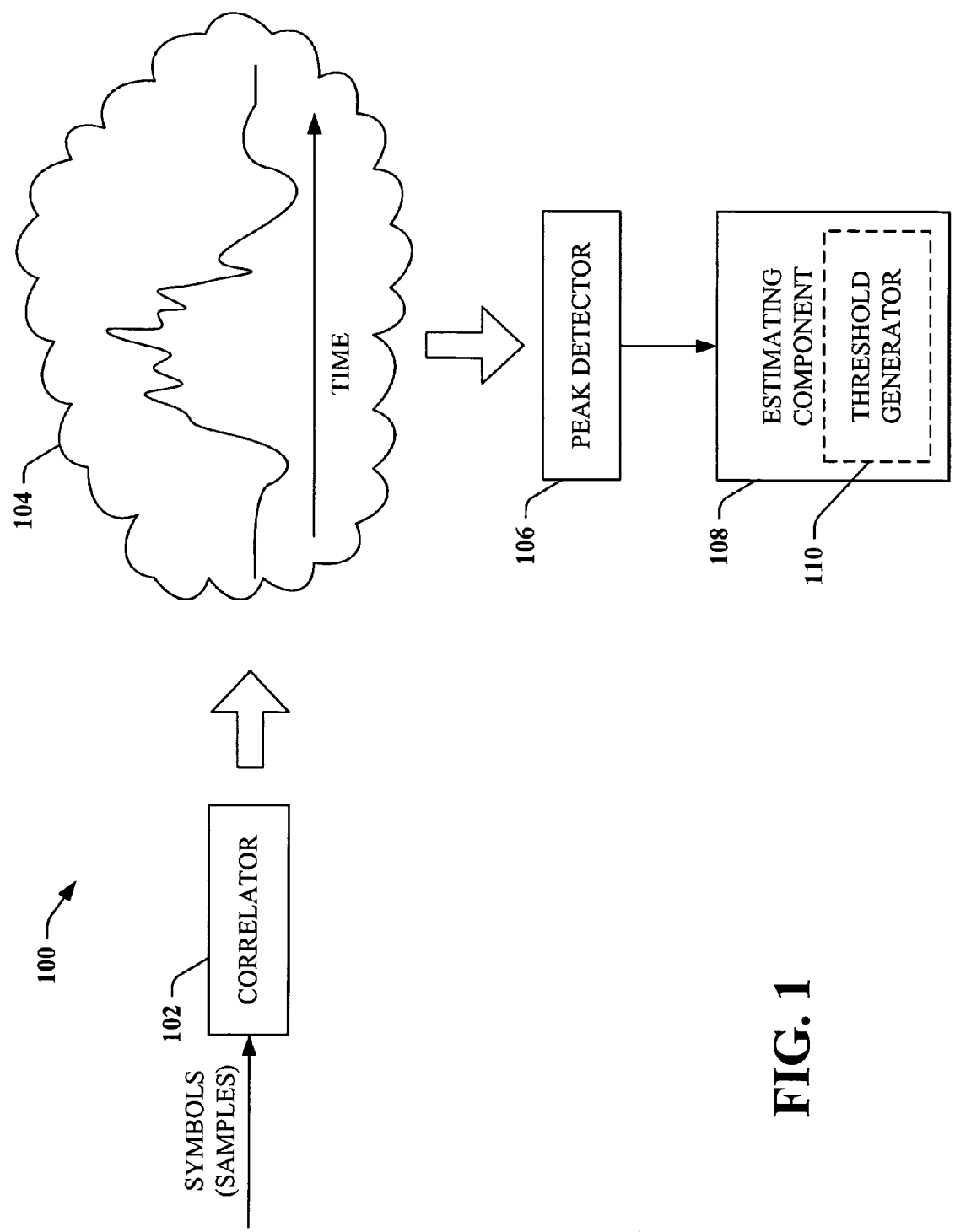
FIG. 1 is a high-level block diagram of a system that facilitates obtaining a coarse timing estimate with respect to a symbol boundary in a wireless embodiment.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In accordance with one or more embodiments and corresponding disclosure thereof, various aspects are described in connection with a subscriber station. A subscriber station can also be called a system, a subscriber unit, mobile station, mobile, remote station, access point, base station, remote terminal, access terminal, user terminal, user agent, or user equipment. A subscriber station may be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem.

Communication systems are widely deployed to provide various communication services such as voice, packet data, and so on. These systems may be time, frequency, and/or code division multiple-access systems capable of supporting communication with multiple users simultaneously by sharing the available system resources. Examples of such multiple-access systems include Code Division Multiple Access (CDMA) systems, Multiple-Carrier CDMA (MC-CDMA), Wideband CDMA (W-CDMA), High-Speed Downlink Packet Access (HSDPA), Time Division Multiple Access (TDMA) systems, Frequency Division Multiple Access (FDMA) systems, and Orthogonal Frequency Division Multiple Access (OFDMA) systems.

Referring now to the drawings, FIG. 1 illustrates a high-level system overview in connection with one exemplary embodiment. The exemplary embodiment relates to a novel system 100 that facilitates generating a coarse estimation of a boundary of a wireless symbol (e.g., an OFDM symbol, an OFDMA symbol, a CDMA symbol, . . . ) in time, wherein coarse estimations produced by the system 100 exhibit various benefits over coarse estimations generated by conventional systems/methodologies. The system 100 includes a correlator 102 that receives symbols (which can include a plurality of samples). The symbols are received in the time domain, and can, for example, include a cyclic prefix. Cyclic prefixes are associated with samples that appear at an end of a same symbol (thus, for example, a set of substantially similar samples can appear in an OFDM symbol). In one exemplary embodiment, the cyclic prefix can be 512 samples in length, and a remainder of the symbol can be 4096 samples in length. The correlator 102 operates conventionally by correlating samples within a cyclic prefix with corresponding samples at an end of the symbol and outputting an energy distribution 104 according to correlations within the symbol. The energy distribution 104 indicates a level of correlation between received samples/symbols (or portions thereof) over time. In a noiseless channel not subject to multi-path effects, the energy distribution would include a peak energy that is indicative of a boundary between symbols. The correlator 102, for example, can utilize cross-correlation techniques, autocorrelation techniques, delay correlation techniques, or any other suitable correlation techniques in connection with generating the energy distribution 104. Briefly, cross correlation is a measure of similarity between disparate symbols or portions thereof, and autocorrelation relates to cross-correlating a signal (or portions thereof) with itself, and is useful for locating repeating patterns in a signal and/or symbol therein.

After processing the symbols, the correlator outputs the energy distribution 104 (which can be represented by a graph), where the energy distribution 104 essentially illustrates a level of correlation within portions of a symbol or between symbols with respect to time. In a noiseless channel not subject to multi-path effects, the energy distribution 104 will include a peak (representable in a graphical form as a triangle, for example), wherein such peak can be utilized to determine where an edge of a symbol exists with respect to time. When noise is introduced into the channel, however, determining a boundary of a symbol by a peak of the energy distribution 104 can become problematic.

More specifically, a peak of the energy distribution 104 may not represent a boundary of a wireless symbol when noise is introduced into the channel. Greater difficulties in connection with determining a boundary of a symbol with respect to time arise when symbols are relayed over a channel subject to multi-path effects. These difficulties exist due to disparate noise levels with respect to different paths, disparate timing delays with respect to disparate paths, and the like. Thus, rather than a distinct peak that clearly indicates a boundary of a symbol, the energy distribution 104 output by the correlator 102 may not include a peak clearly indicative of a boundary of a symbol. In contrast, a peak energy of the energy distribution 104 output by the correlator 102 can correspond to a position in time that is not sufficiently proximate to a boundary of a wireless symbol (e.g., an OFDM symbol). Accordingly, utilizing such timing information can cause decoding errors to occur at a receiver. Fine tuning algorithms are employed to more precisely determine a boundary position in time; however, utilizing a substantially incorrect coarse estimation in connection with the fine tuning algorithms can result in significant overhead as well as decrease in performance.

The system 100 further includes a peak detector 106 that monitors output of the correlator 102 and locates a peak energy level of such output, which corresponds to a particular position in time (e.g., the exemplary energy distribution 104 is illustrated with respect to time). Conventional coarse timing estimation systems utilize the peak detector 106 to determine a time associated with a peak energy of the energy distribution 104, and thereafter traverse backwards in time a pre-defined fixed amount and utilize such time as a coarse estimate. These conventional systems operate adequately when a channel is not subject to substantial noise. If, however, the channel is associated with substantial noise, this conventional method is not robust and can result in significant coarse timing estimate error.

The system 100 provides improved performance over conventional systems by employing an adaptive "back off" after determination of a peak energy of the energy distribution 104. In one particular example, an estimating component 108 generates an adaptive coarse timing estimate as a function of a magnitude of the peak located by the peak detector 106. Specifically, the estimating component 108 includes a threshold generator 110 that can produce a threshold value as a function of a magnitude of the detected peak. Thereafter, a first point in time prior to occurrence of the peak energy level that the threshold is substantially similar to an energy level in the energy distribution 104 can be utilized as a coarse timing estimate. In one particular example, a peak energy of the energy distribution 104 is located by the peak detector 106, and a magnitude of the peak is stored in memory (not shown). The magnitude of the peak is then received by the estimating component 108 and the threshold generator 110, which utilizes such magnitude (e.g., multiplies the magnitude by a selected parameter) to generate a threshold value. The energy distribution 104 can then be analyzed backwards in time from the detected peak until a value of the energy distribution 104 is substantially similar to the threshold value for a first time. A point in time corresponding to this intersection can thereafter be employed as a coarse estimate.

The system 100 thus utilizes an adaptive "back off" technique, rather than a fixed "back off" technique of conventional systems. The term "back off" refers to determining a coarse timing estimate by traversing backwards in time from a peak of the energy distribution 104. The approach is adaptive as magnitudes of peaks of disparate energy distributions output by correlators change with respect to differing channel conditions. The system 100 has empirically been shown to produce coarse timing estimates that are statistically superior to coarse timing estimates generated by conventional systems. For example, the system 100 exhibits improvements with respect to standard deviation, mean invariance, and other statistical measures when compared to conventional systems/methodologies. Furthermore, the system 100 can be employed in connection with any number of suitable devices with wireless communications capabilities. For example, the system 100 can be employed within a mobile phone, a personal digital assistant, a laptop computer, a desktop computer, or the like. Moreover, the system 100 can be utilized in connection with a tower that relays signals to mobile units.

Figure 2:
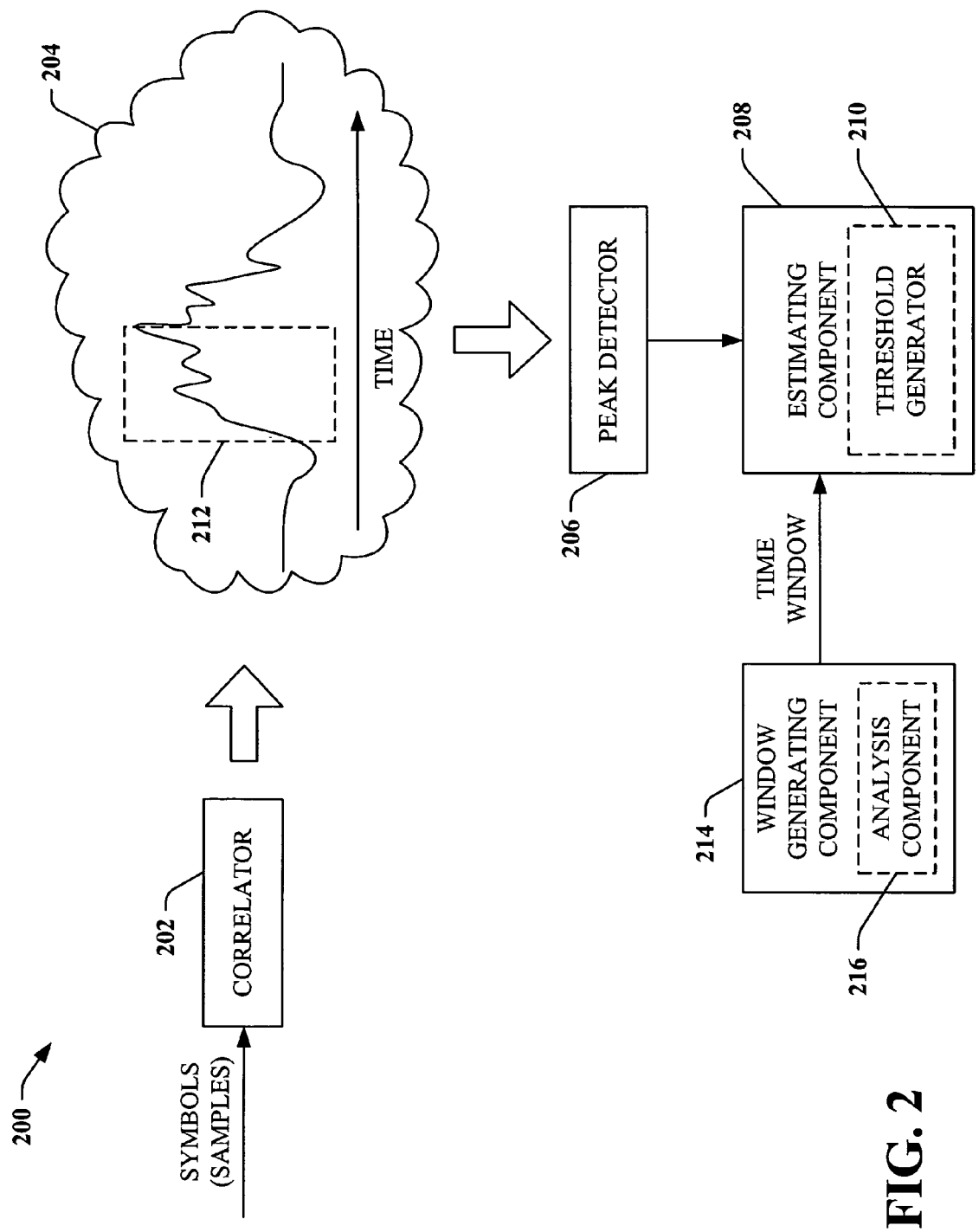
FIG. 2 is a block diagram of a system that facilitates obtaining a coarse timing estimate with respect to a wireless symbol boundary, wherein the coarse timing estimate occurs within a generated time window.

Turning now to FIG. 2, a system 200 that facilitates generation of a coarse timing estimate with respect to a boundary between wireless symbols is illustrated. Coarse timing estimates produced by the system 200 are statistical improvements over coarse timing estimates generated by conventional systems. The system 200 includes a correlator 202 that receives one or more wireless symbols (in the time domain), wherein each symbol includes a plurality of samples (depending upon a sampling rate). For example, OFDM symbols include a cyclic prefix; therefore, the correlator 202 can be employed to locate correlations between samples in the cyclic prefix and samples at a boundary of such OFDM symbols. Any suitable correlation between symbols and/or portions of symbols, however, can be employed in connection with determining a boundary of a wireless symbol. For example, symbols in a wireless environment can each include a common grouping of samples at substantially similar portions of symbols. Thus, the correlator 202 can be utilized to locate substantially similar samples between symbols, and use such correlation to locate a boundary therebetween. Output of the correlator 202 can be an energy distribution 204, where magnitude increases in the energy distribution 204 indicate correlation between samples or a set of samples considered by the correlator 202. Thus, a peak energy of the energy distribution 204 in a noiseless channel not subject to multi-path effects can be indicative of a boundary of a symbol received by the correlator 202. As described above, however, channels subject to multi-path effects are typically employed in wireless communication networks (e.g., OFDM, OFDMA, CDMA, TDMA, GSM, . . . ), and therefore samples can be subject to delay and noise dependent upon path(s) over which particular samples travel. Thus, a peak of the energy distribution 204 may not adequately represent a boundary of a wireless symbol in time.

Output of the correlator 202 is received by a peak detector 206, which determines a magnitude of a peak of the energy distribution 204 as well as a location in time in which the peak occurs. While output of the correlator 202 has been described to include a peak that can be utilized as an indicator of a boundary of a wireless OFDM symbol, any suitable indicator of boundary output by a correlator is contemplated and intended to fall under the scope of the hereto-appended claims. For example, one can imagine a correlator outputting a valley that is indicative of a boundary of a wireless symbol in time. In a disparate embodiment, an increasing and/or decreasing slope of a certain grade can be indicative of a boundary of a wireless symbol in time. Accordingly, any suitable indicia of boundary output by the correlator 202 can be detected by the peak detector 206 (even if such indicia is not a peak of the energy distribution 204).

In one exemplary embodiment, an estimating component 208 that is associated with a threshold generator 210 receives a magnitude of the peak energy of the energy distribution 204 as well as timing information associated with such peak. For instance, the estimating component 208 can receive an entirety of the energy distribution 204 together with a magnitude and location of a peak energy of such energy distribution 204 as determined by the peak detector 206. As previously described, conventional coarse estimation systems utilize a pre-defined time value and traverse backwards in time from a peak energy of the energy distribution 204 such pre-defined value, and use a result of such traversing as a coarse estimate. In contrast, the system 200 is adaptive in that a value utilized for traverse can be a function of a magnitude of a peak (or a valley, a slope, or any other suitable indicia) of the energy distribution 204, which can alter with each symbol and each correlation. For one particular example, a parameter can be multiplied by a detected magnitude of a peak of the energy distribution 204, and a resultant value of the multiplication can be employed as a threshold. The energy distribution 204 can then be analyzed, and a first instance in time prior to occurrence of the peak that an energy level is substantially similar to threshold can be determined.

Such instance in time can be employed as a coarse estimate unless the instance occurs outside a defined time window 212. The time window 212 can be provided by a window generating component 214, which can employ an analysis component 216 in connection with generating the time window 212. The time window 212 produced by the window generating component 214 and the analysis component 216 can be relayed to the estimating component 208, which can ensure that a coarse estimate falls within such time window 212. The analysis component 216 can generate the time window 212 based on estimated channel noise, previous time windows 212, and the like. For example, the system 200 can be associated with a system that utilizes the coarse timing estimate to determine a more precise estimate of a boundary of OFDM symbols with respect to time (e.g., post-FFT fine tuning algorithms can be employed). Given disparate channel conditions and performance with disparate time windows, the analysis component 216 can analyze such channel conditions and generate time windows that facilitate production of optimal coarse estimates. For one particular example, a first time window can be generated and a coarse estimate can be located near a boundary of such time window. A fine-tuning algorithm can thereafter be utilized to obtain a more precise timing estimate based upon the coarse timing estimate, and a level of precision of the coarse estimate can be mapped against a size of the time window 212 and proximity of the coarse estimate to an edge thereof. Thus, over time, the analysis component 216 can determine a timing window that corresponds with optimal performance of the estimating component 208. In a disparate embodiment, simulations can be employed to determine a size of the time window 212, and such time window 212 can thereafter simply be a program parameter.

Figure 3:
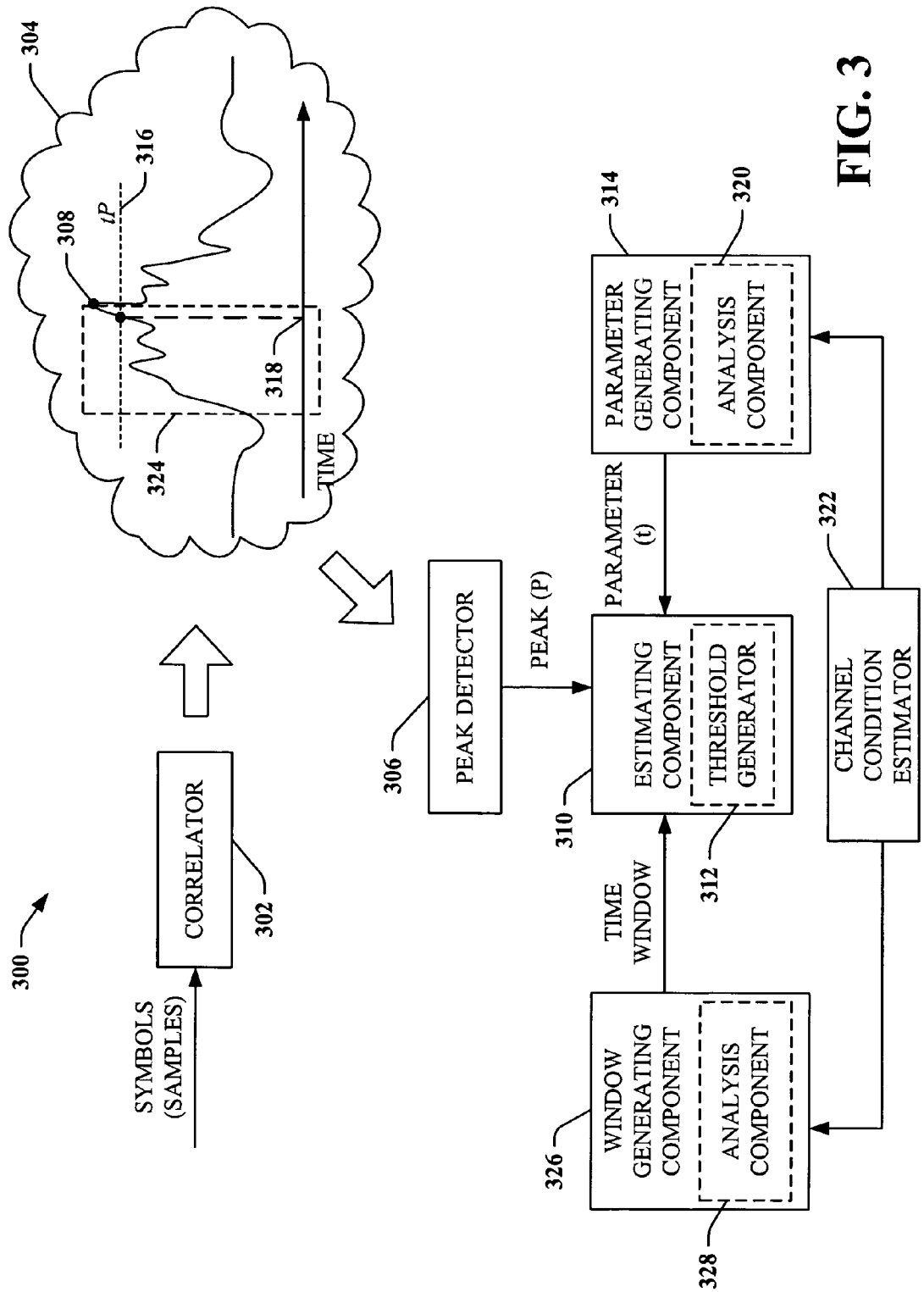
FIG. 3 is a block diagram of a system that facilitates generating a coarse timing estimate with respect to a wireless symbol boundary by way of generating an adaptive threshold.

Now referring to FIG. 3, a coarse estimation system 300 is illustrated. The system 300 includes a correlator 302 that receives one or more wireless symbols in the time domain, wherein such symbols include a plurality of samples. The correlator 302 analyzes the samples within a symbol or between symbols and locates correlations between such samples. Thus, for example, OFDM symbols include a cyclic prefix; therefore, the correlator 302 can be employed to facilitate determining a boundary of an OFDM symbol. In one exemplary embodiment, the correlator 302 can output an energy distribution 304 that illustrates a correlation between portion(s) of a symbol over time, and can thus indicate a boundary of an OFDM symbol (due to existence of the cyclic prefix). As described above, in a noiseless channel not subject to multi-path effects, a peak energy level of the energy distribution can precisely indicate a boundary of an OFDM symbol. In a channel subject to multi-path effects, however, noise and path delay can cause a peak energy of the energy distribution 304 output by the correlator 302 to not be indicative of a boundary of an OFDM symbol.

A peak detector 306 locates a peak energy 308 of the energy distribution 304 and determines a magnitude (P) of such peak energy 308. The magnitude P as well as a location in time of the peak energy 308 can be stored in memory (not shown) associated with the peak detector 306. The magnitude P and location thereof is delivered to an estimating component 310 that generates a coarse timing estimate with respect to a boundary of an OFDM symbol received by the correlator 302. The coarse estimate, for example, can be a function of a magnitude of the peak energy 308, thus generating an adaptive "back off" compared to a fixed "back off" utilized in conventional systems. The term "back off" refers to a time traversed backwards from a time associated with occurrence of the peak energy 308 that is utilized as a coarse estimate. The "back off" of the described embodiment(s) is adaptive as the estimating component utilizes a magnitude of the peak (P) to determine an amount of back off, and peak magnitudes can alter from symbol to symbol, channel to channel, etc.

The estimating component 310, for example, can determine a coarse estimate by employing a threshold generator 312 to generate a threshold, which is compared with the energy distribution 304. In a more specific example, a parameter generating component 314 can provide the estimating component 310 (and the threshold generator 312) with a parameter t that is a function of the magnitude P of the peak energy 308 (e.g., the parameter t can be multiplied by the magnitude P). For example, a threshold 316 can be created at a magnitude of tP. To obtain a coarse estimate, the energy distribution 304 can be analyzed to locate an instance in time 318 that the threshold 316 is substantially similar to an energy level of the energy distribution 304. The instance in time corresponds to an energy level that corresponds to a beginning of a received signal (e.g., corresponds to a boundary of a symbol). This instance in time 318 can thereafter be employed as a coarse estimate for a boundary of an OFDM symbol with respect to time. To generate the parameter t, the parameter generating component 314 can utilize an analysis component 320. For example, a value of the parameter t can be initially defined and utilized, and performance of such parameter can be tracked over time. A value of the parameter t can be altered in either direction until optimal performance of the system 300 is achieved. The parameter generating component 314 can further employ a channel condition estimator 322 in connection with producing the parameter t. For instance, a parameter value that is associated with optimal coarse timing estimates can depend upon noise in a channel, multi-path effects associated with a channel, and various other channel conditions. The channel condition estimator 322 can produce estimates of disparate channel conditions that can be utilized in connection with determining a value for the parameter t.

The estimating component 310 can further utilize a time window 324 in connection with generating a coarse estimate of an OFDM symbol boundary in the time domain. Specifically, a window generating component 326 can provide the estimating component 310 with the time window 324, wherein the coarse estimate (e.g., the instance in time 318) is required to fall within such time window 324. If the instance in time 318 lies outside the time window 324, then the parameter generating component 314 and/or the window generating component 326 can alter value(s) of the parameter t and the time window 324. Such alteration can be a function of estimated channel conditions produced by the channel estimator 322 and/or previous coarse channel estimates and precision thereof. Similar to the parameter generating component 314, the window generating component 326 can employ an analysis component 328 in connection with producing the time window 324. For instance, a value of time can be initially selected as a program parameter and/or be a function of estimated channel conditions. Thereafter, values relating to the time window 324 can be altered according to precision of coarse estimates generated by the estimating component 310. As can be determined from the above description, the system 300 does not employ a fixed "back off", but rather adaptively selects a coarse estimate as a function of a magnitude of the peak energy 308. The system 300 has empirically illustrated improvements with respect to mean invariance and other similar statistics over conventional coarse estimation systems.

Figure 4:
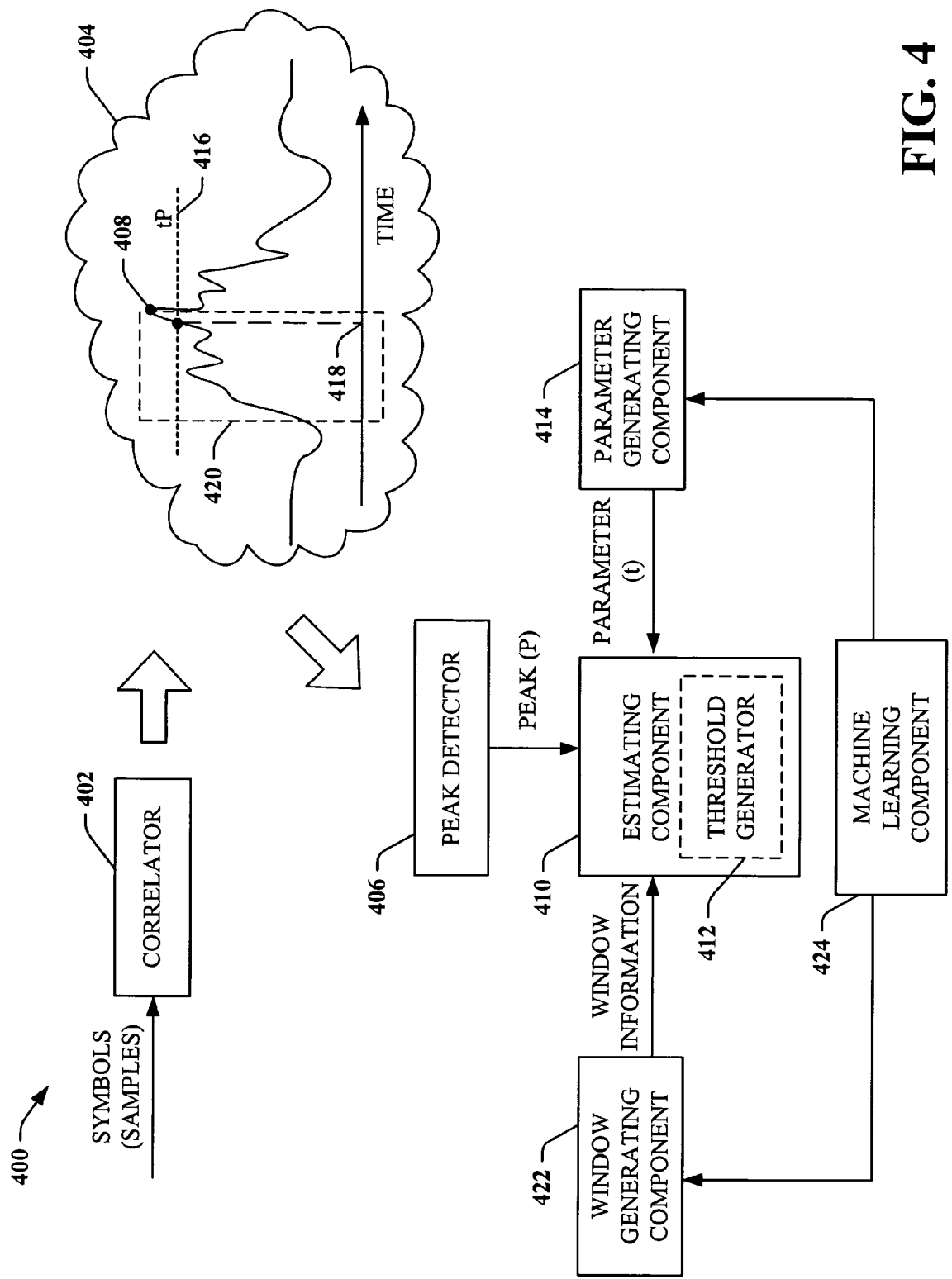
FIG. 4 is a block diagram of a system that employs machine learning in connection with obtaining a coarse timing estimate with respect to a wireless symbol boundary.

Now turning to FIG. 4, a system 400 that facilitates generating a coarse estimate with respect to a symbol boundary in a time domain is illustrated. The system 400 includes a correlator 402 that receives one or more wireless symbols, wherein the wireless symbols include a plurality of samples (e.g., and can including a cyclic prefix). As described above, the correlator 402 can be employed to generate an energy distribution 404 that can be utilized in connection with determining a boundary of a wireless symbol in time. A peak detector 406 can receive the energy distribution 404 and locate a peak energy 408 therein. Furthermore, the peak detector 406 can determine a magnitude P of the peak energy 408. An estimating component 410 that is associated with a threshold generator 412 can receive the magnitude P of the peak energy 408 and a location in time of occurrence of such peak energy 408 and employ such magnitude P in connection with producing a coarse estimate relating to a boundary of a wireless symbol. In a particular example, the threshold generator 412 can receive a parameter t from a parameter generating component 414 and multiply the magnitude P with the parameter t to produce a threshold (tP) 416. The energy distribution 404 can thereafter be analyzed together with the threshold to determine a first instance in time 418 prior to occurrence of the peak energy 408 that the threshold 416 is substantially similar to an energy within the energy distribution 404. The estimating component 410 can also receive a time window 420 fro a window generating component 422, wherein the instance in time 418 should fall within the time window 420.

The parameter generating component 414 and the window generating component 422 can be associated with a machine learning component 424 that generates inferences relating to desirable values of the parameter t and the time window 420. As used herein, the terms to "infer" or "inference" refer generally to the process of reasoning about or inferring states of a system, environment, and/or user from a set of observations as captured by way of events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. For specific examples, the machine learning component 424 can monitor the system 400 over time and learn how the system 400 operates given particular contextual data, such as time of day, temperature, weather conditions, day of week, geographic locations of mobile users, number of mobile users on a network, and the like.

As the machine learning component 424 garners knowledge from this information, it can make inferences with respect to parameter values and time window values that are generated by the parameter generating component 414 and the window generating component 422, respectively. For instance, over time the machine learning component 424 can learn that on a particular day over a period of time network traffic and noise is greater than at a different day and a different time, and that disparate parameter values are better suited for such differing days and times. The machine learning component 424 can thus generate inferences recommending particular parameter values to the parameter generating component 414. Furthermore, the machine learning component 424 can monitor and analyze trends in parameter values that result in improved coarse estimation, and make inferences as a function of such trends. Thus, rather than defining parameter values, the learning component 424 can analyze trends to obtain optimal values for the parameter (t) and the time window 420.

Referring to FIGS. 5-8, methodologies relating to generating coarse estimates of wireless symbol boundaries in time domain are illustrated. For example, methodologies can relate to symbols in an OFDM environment, an OFDMA environment, a CDMA environment, or any other suitable wireless environment. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Figure 5:
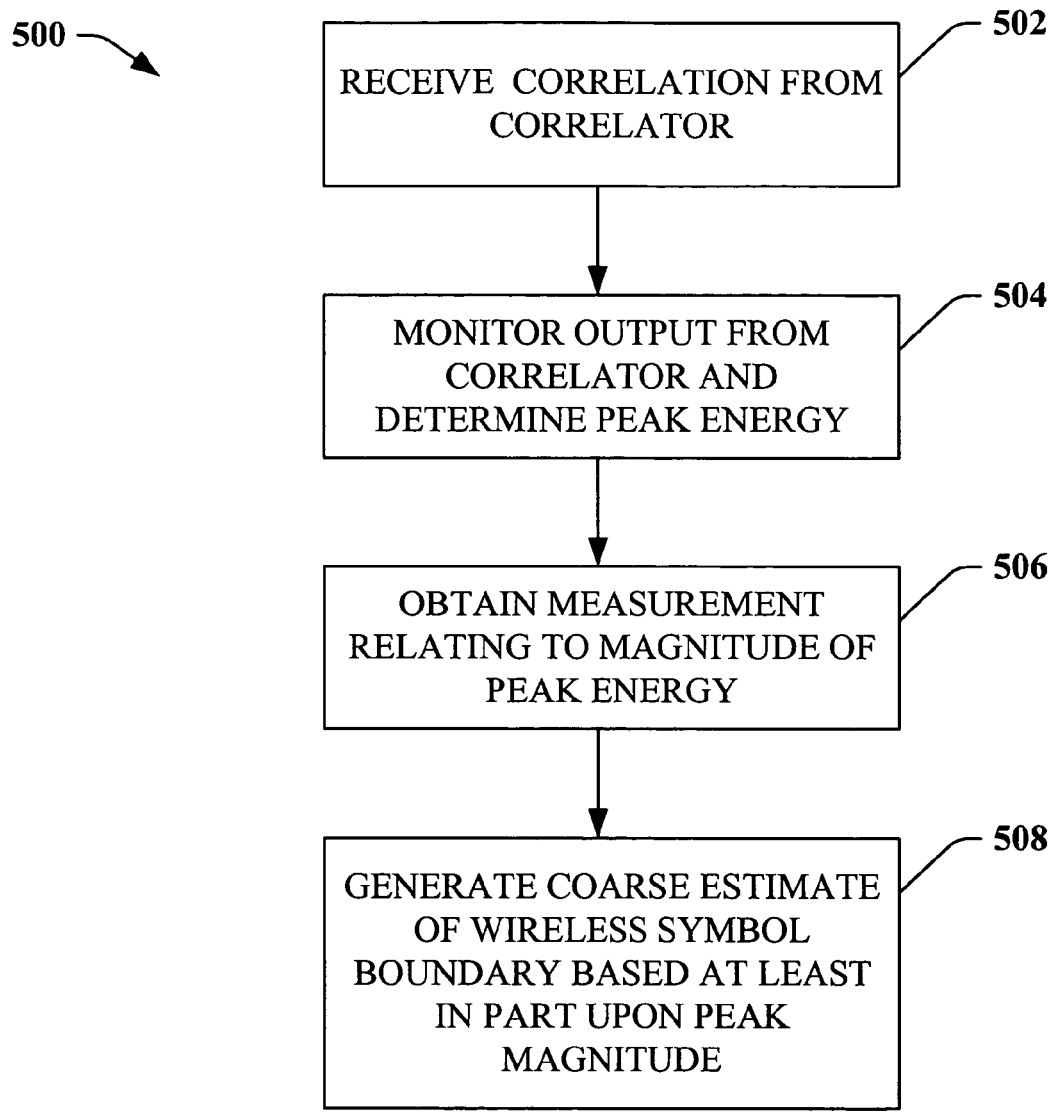
FIG. 5 is a flow diagram illustrating a methodology for generating a coarse estimate of location of a wireless symbol boundary with respect to time.

Referring now solely to FIG. 5, a methodology 500 for generating a coarse estimate with respect to a wireless symbol boundary in a time domain is illustrated. At 502, a cyclic prefix correlation is received from a correlator. For example, OFDM symbol structures include a cyclic prefix at a beginning of a symbol, which is a collection of samples that appears at an end of the symbol (e.g., substantially similar samples exist at both ends of OFDM symbols). Cyclic prefix correlation refers to correlating a symbol to determine where within the symbol or collection of symbols substantially similar samples exist. By employing a correlator, data indicative of a boundary of an OFDM symbol can be obtained. Other prefixes and/or suffixes within a symbol can also be employed in connection with determining a symbol boundary. For instance, similar samples can be positioned at similar positions within disparate symbols—accordingly, location in time of such similar samples can be determined, and this time location can be employed in connection with estimating a symbol boundary.

At 504, output of the correlator (e.g., an energy distribtution) can be monitored to determine a peak energy level. The peak energy level is indicative of a boundary of a wireless symbol in time. Due to noise, delay caused by multi-path effects, and other channel hostilities, the peak energy level may not sufficiently correlate with a boundary of the wireless symbol. At 506, a magnitude measurement relating to the peak energy of the energy distribution output by the correlator can be obtained and stored. In contrast to conventional coarse estimation methodologies, the methodology 500 employs a magnitude of the peak to obtain a coarse estimation, rather than utilizing fixed, defined attributes. Thus, the methodology 500 can be considered adaptive, as peak energy levels of energy distributions output by correlators alter with disparate symbols, channel conditions, and the like.

At 508, a coarse estimate of a wireless symbol boundary is generated as a function of the magnitude of the peak energy level. In one particular example, the magnitude can be multiplied with a parameter value, where the parameter value is less than one. A result of the multiplication is a threshold that can be compared with the energy distribution output by the correlator. For instance, a first instance in time prior to occurrence of the peak energy that an energy level of the energy distribution is substantially similar to the threshold can be employed as a coarse estimate of a symbol boundary.

Figure 6:
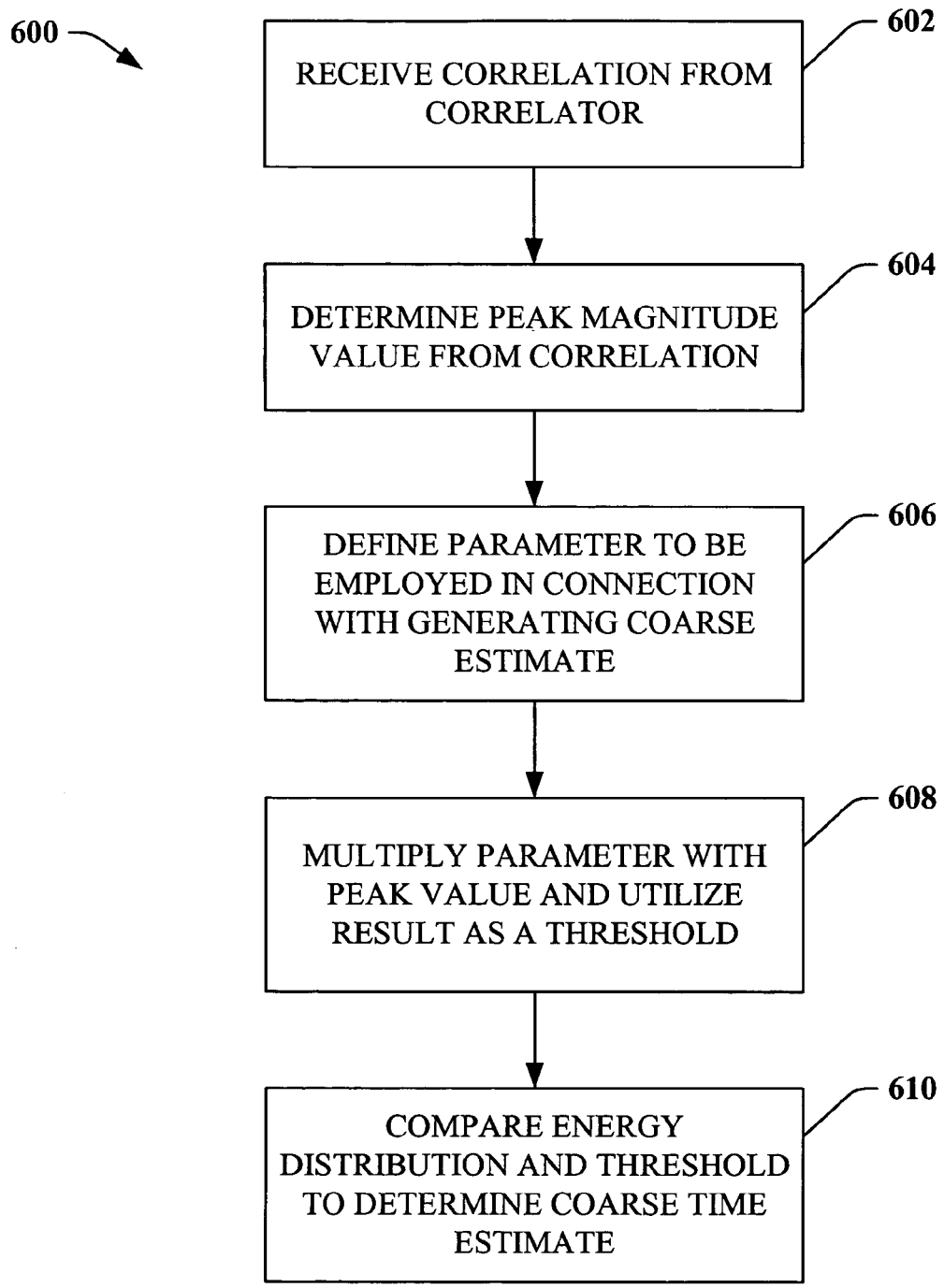
FIG. 6 is a flow diagram illustrating a methodology for generating an adaptive threshold utilized in connection with obtaining a coarse timing estimate with respect to a wireless symbol boundary.

Turning now to FIG. 6, a methodology 600 for generating a course estimate of a wireless symbol boundary in the time domain is illustrated. At 602, a correlation is received from a correlator. As described supra, the correlation can be output from a correlator as an energy distribution, where a peak energy of such energy distribution is indicative of a boundary of a wireless symbol. At 604, a peak magnitude value is obtained from the correlation. Such peak magnitude value can be stored and later utilized for obtaining a coarse estimate of a boundary of a wireless symbol. At 606, a parameter to be employed in connection with generating a coarse estimate is defined. For example, the parameter can be pre-defined as a program parameter based upon empirical data. In a disparate embodiment, the parameter value can be adaptive to channel conditions, wherein such parameter can be obtained from an algorithm that analyzes channel conditions and various other contextual data to determine a parameter value. For instance, an initial parameter value can be defined, and thereafter the value can be altered and results relating to such alteration can be analyzed to determine an optimal parameter value. Thus, as channel conditions change, the parameter value will continue to facilitate obtainment of improved coarse estimations over conventional systems/methodologies.

At 608, the parameter is multiplied with a peak energy value, and a result of such multiplication is utilized as a threshold value. Thus, the parameter should be a value of less than one (e.g., if the parameter value were greater than one, the threshold could not be employed). In accordance with one particular embodiment, the parameter can lie within a range between ½ and 1. This range has empirically been shown to produce adequate coarse timing estimates of wireless symbol boundaries. The threshold can then be compared with the energy distribution output by the correlator. At 610, a point in time is located, wherein such point corresponds to a first instance in time prior to occurrence of the peak energy level that the threshold is substantially similar to a point in the energy distribution. This point can be employed as a coarse estimation of a wireless symbol boundary in a time domain. Coarse estimates obtained from the method 600 have empirically been found to be associated with improved standard deviation statistics, mean invariance statistics, and the like.

Figure 7:
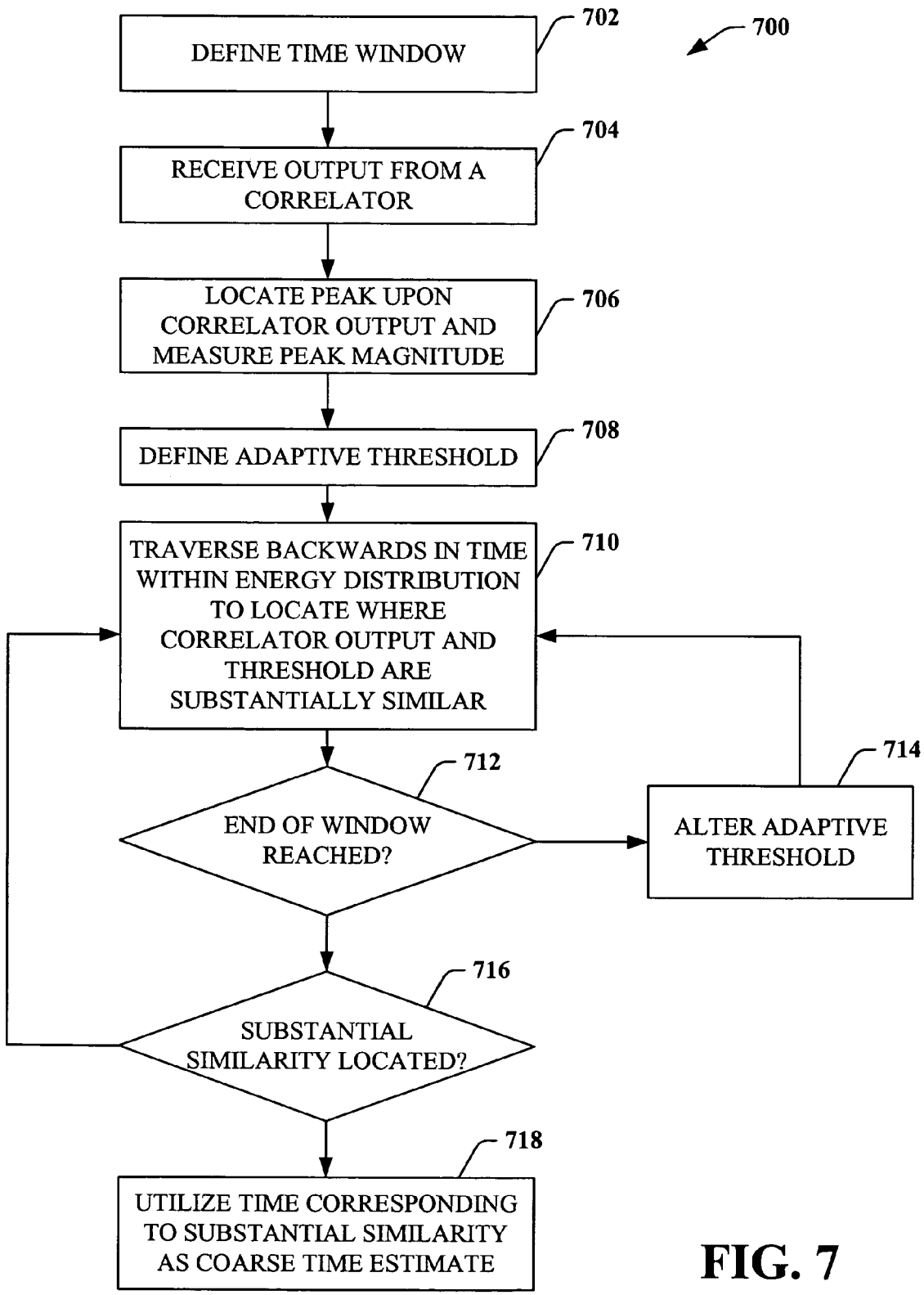
FIG. 7 is a flow diagram illustrating a methodology for determining that a coarse timing estimate is within an acceptable time window.

Referring now to FIG. 7, a methodology 700 for obtaining a coarse estimate of a boundary of a wireless symbol in time is illustrated. At 702, a time window is defined. The time window is a limitation of location of a coarse estimate in time. In the methodology 700, the time window is employed to ensure that a coarse estimate is within a particular period of time from a peak energy level of an energy distribution output by a correlator. At 704, an output of a correlator relating to a wireless symbol is received. For example, OFDM symbols include a cyclic prefix, and the correlator can undertake a cyclic prefix correlation to output an energy distribution that is indicative of a boundary in time of the OFDM symbol. In accordance with one exemplary embodiment, a peak energy within the energy distribution output by the correlator can be indicative of a boundary in time of the OFDM symbol.

At 706, a peak energy of the correlator output is located, and magnitude of such peak is measured and stored. At 708, an adaptive threshold is defined, wherein the adaptive threshold is a function of a determined magnitude of the peak energy level. For instance, a parameter can be defined and multiplied with the measured magnitude of the peak, and a result of such multiplication can be the adaptive threshold. Accordingly, the parameter is a value less than one. The parameter can thereafter be compared with the energy distribution to determine a coarse estimate of a symbol boundary with respect to time. At 710, the energy distribution is analyzed, and a first instance in time prior to an occurrence of the peak energy that the threshold is substantially similar to an energy within the energy distribution. At 712, a determination is made regarding whether an end of the time window defined at 702 has been reached. If the end of the time window has been reached prior to occurrence of the instance of time determined at 710, then at 714 the adaptive threshold is altered. For example, a parameter employed to multiply with the stored magnitude can be increased. More specifically, if the parameter value was equal to 0.7, and a threshold generated utilizing that parameter did not result in an intersection within the time window, the parameter value can be raised to 0.75. Upon altering the adaptive threshold, the methodology continues at 710. If the end of the time window has not been reached, a determination is made at 716 regarding whether the threshold has been found to be substantially similar to an energy of the energy distribution. If such substantial similarity has been determined prior to reaching an end of the time window, at 718 a time corresponding to the substantial similarity is utilized as a coarse estimate of a boundary of an OFDM symbol in time. If the substantial similarity between the threshold and an energy level within the energy distribution is not located and the end of the time window has not been reached, the methodology returns to 710 and continues.

Figure 8:
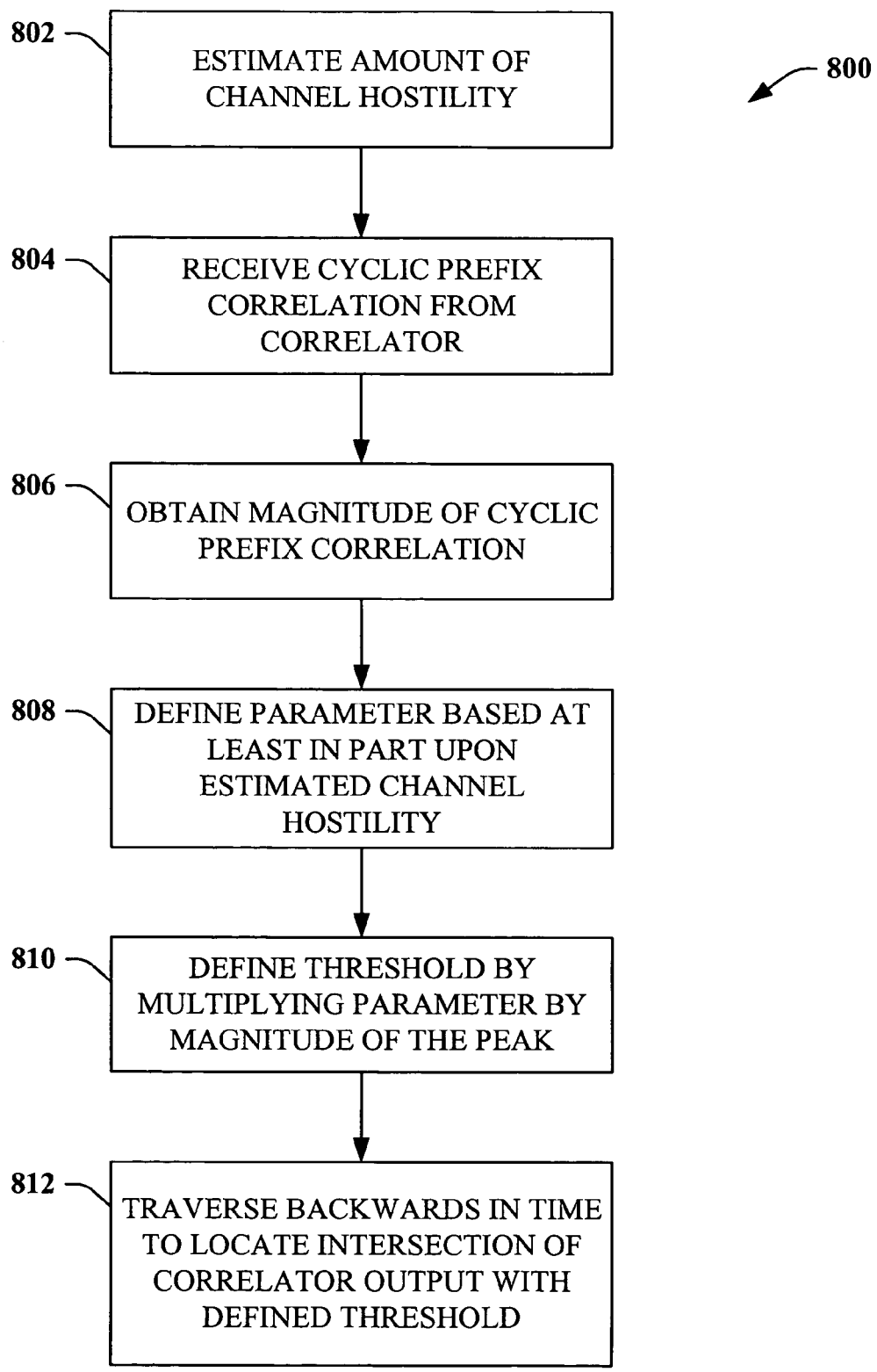
FIG. 8 is a flow diagram illustrating a methodology for obtaining a coarse timing estimate with respect to a location of a wireless symbol boundary with respect to time by utilizing an estimate of channel noise.

Now turning to FIG. 8, a methodology 800 for generating a coarse estimate of a boundary of a wireless symbol in time is illustrated. At 802, an amount of noise in a channel is estimated. This noise estimate can depend upon multi-path effects upon a channel and other suitable channel attributes. Furthermore, an amount of channel noise can be estimated based upon previous observations of the channel. At 804, a cyclic prefix correlation is received from a correlator (e.g., the cyclic prefix correlation can be an energy distribution that can be represented graphically, wherein particular slopes and/or peaks of a graphical representation of the energy distribution can correspond to correlation between portions of an OFDM symbol). At 806, a peak energy in the cyclic prefix correlation (e.g., the energy distribution) is located, and a magnitude of such peak energy is obtained. At 808, a parameter is defined as a function of noise in the channel estimated at 802. For instance, if there is a substantial amount of noise, then it may be beneficial to generate a parameter with a lesser value than a parameter value that would be generated if there is not substantial noise in the channel. At 810, a threshold value is defined by way of multiplying the parameter defined at 808 with the magnitude obtained at 806. As the threshold depends upon magnitude of the peak energy and a parameter, and peak energy magnitudes are not constant between symbols/channels, the method 800 is adaptive when compared to conventional, fixed "back off" systems/methodologies. At 812, the cyclic prefix correlation is analyzed and traversed backwards in time until the threshold and the cyclic prefix correlation intersect for a first time. A point in time of this intersection is then employed as a coarse estimate of a boundary of an OFDM symbol.

Figure 9:
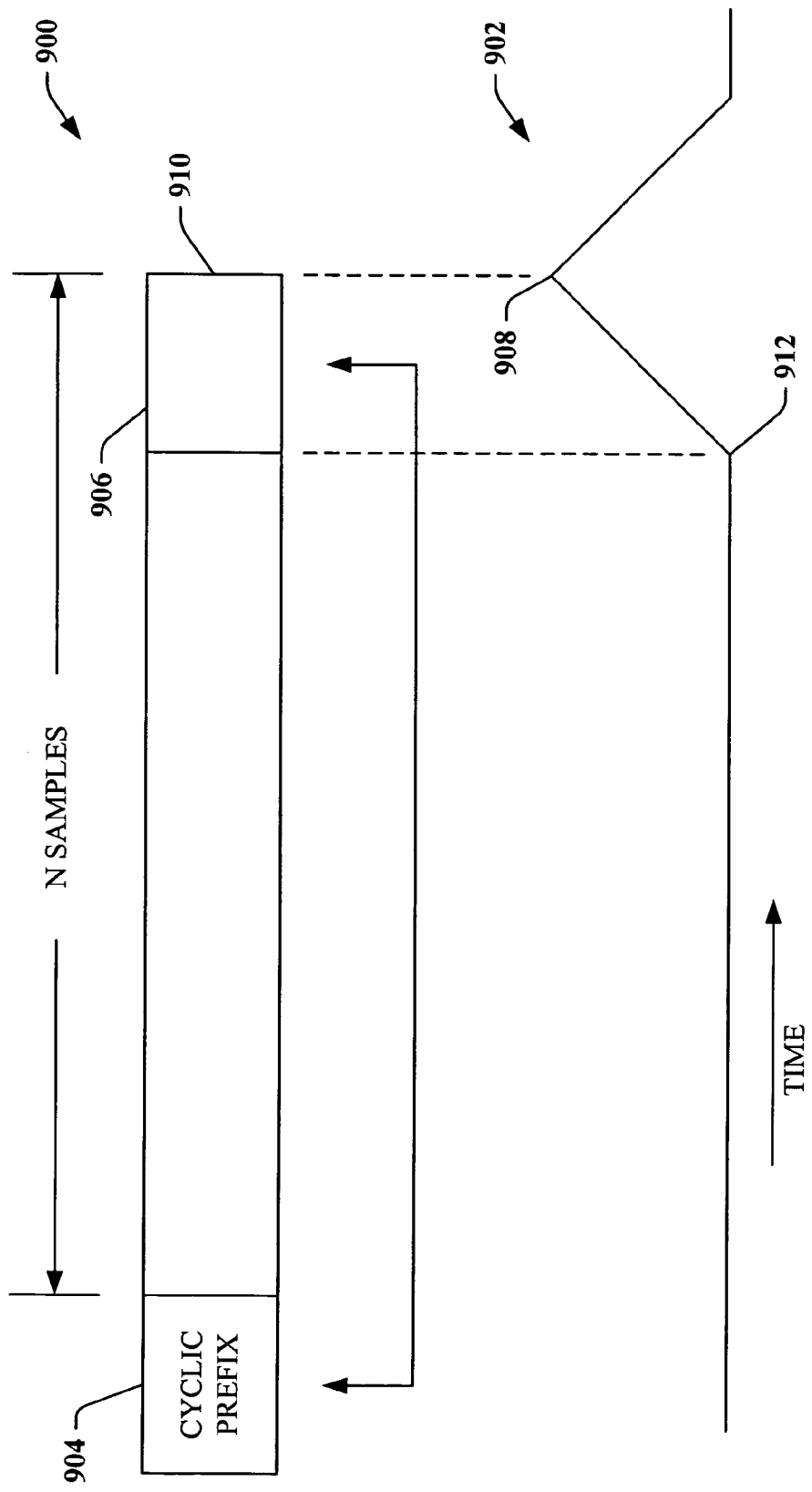
FIG. 9 illustrates an exemplary OFDM symbol and a corresponding cyclic prefix correlation in a noiseless single-path channel.

Referring now to FIG. 9, an exemplary symbol 900 that can be employed in an OFDM environment and a corresponding cyclic prefix correlation 902 is illustrated with respect to a noiseless channel not subject to multi-path. The symbol 900 includes a cyclic prefix 904, which consists of a plurality of samples within the time domain. A plurality of samples 906 that is substantially similar to samples within the cyclic prefix 904 is located at an opposite end of the symbol 900 as the cyclic prefix 904. The symbol 900 includes N samples that are not duplicative and are thus desirably demodulated. The cyclic prefix correlation includes a peak energy 908 that is associated with an end of the symbol 900. Thus, in a noiseless channel that is not subject to multi-path effects, a boundary 910 of the symbol 900 can be determined by analyzing the cyclic prefix correlation 900 (e.g., the boundary 910 exists at a substantially similar position in time as the peak 908). Furthermore, as can be determined by viewing the symbol 900 and the cyclic prefix correlation 902 in conjunction, a beginning of samples that are substantially similar to samples within the cyclic prefix 904 is indicated by initiation of a slope rising to the peak 908 at 912.

Figure 10:
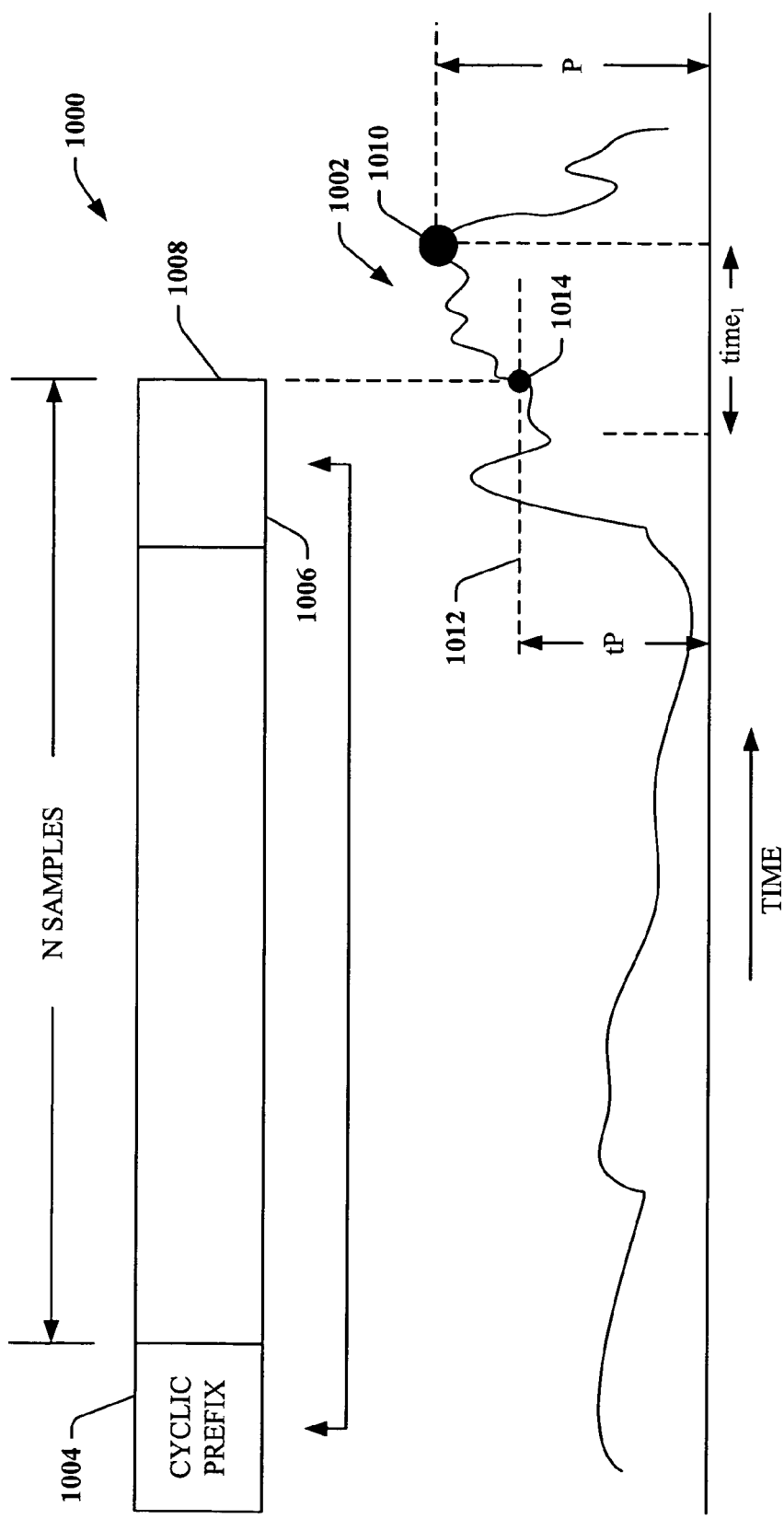
FIG. 10 illustrates an exemplary OFDM symbol and a corresponding cyclic prefix correlation in a multi-path channel that is subject to noise.

Now turning to FIG. 10, an exemplary symbol 1000 that can be utilized in a wireless environment (e.g., OFDM, OFDMA, . . . ) and a corresponding cyclic prefix correlation 1002 is illustrated, wherein the symbol is delivered over a multi-path channel that is associated with noise. The cyclic prefix correlation 1002 is in actuality a distribution of energy indicative of correlations between considered samples/symbols. Thus, a peak energy level is indicative of a boundary between substantially similar samples/symbols. Like the symbol 900 (FIG. 9), the symbol 1000 can include a cyclic prefix 1004, which includes substantially similar samples as those samples 1006 that are existent at an opposite end of the symbol 1000. It is to be understood, however, that other arrangements of samples is contemplated and intended to fall under the scope of the hereto-appended claims. For instance, substantially similar samples can be positioned at similar positions of a plurality of disparate symbols. Thus, locating similarity between samples of symbols enables determination of a coarse estimate of a boundary between such symbols with respect to time. The cyclic prefix correlation 1002 provides an indication of a boundary 1008 in time of the symbol 1000. In particular, the cyclic prefix correlation 1002 includes a portion that begins to slope upwards, corresponding to a beginning of the samples 1006. In a noiseless channel with no delay, a peak energy 1010 would correspond to the boundary 1008 of the OFDM symbol 1000. Due to noise and delay of typical channels, however, the peak energy 1010 can be a significant distance in time from the boundary 1008.

The systems and methods of one or more embodiments improve coarse estimations by adaptively "backing off" from a time associated with the peak energy 1010. In conventional systems, as an example, a time time$_1$ can be pre-defined, and a coarse estimate is obtained by noting a time associated with the peak energy 1010 and subtracting time$_1$ therefrom. This conventional method is not robust, and often does not provide optimal coarse estimation of a location of the boundary 1008 in time. In one exemplary embodiment, a magnitude of the peak energy P can be obtained and utilized to generate a threshold 1012. In particular, the magnitude P can be multiplied with a parameter t, wherein the parameter is less than zero. Thereafter, the cyclic prefix correlation 1002 can be analyzed with respect to time to locate a first position in time prior to occurrence of the energy peak that the threshold 1012 is substantially similar to the cyclic prefix correlation 1002 at point 1014. A time corresponding to point 1014 is then employed as a coarse estimate for the boundary 1008 of the symbol 1000. Employing the magnitude of the peak 1010 of the cyclic prefix correlation to generate a threshold provides an "adaptive back off", as disparate cyclic prefix correlations will be associated with disparate conditions, attributes, and peak energy magnitudes. This adaptive approach has been empirically found to be an improvement over conventional systems/methodologies for obtaining coarse estimates of a symbol boundary in time.

Referring collectively to FIGS. 11-22, graphs representing exemplary empirical data with respect to obtaining OFDM timing and frequency estimates are illustrated. Generally, time synchronization (e.g., determining a boundary of a symbol utilized in an OFDM environment in time) is acquired in two stages. First, a pre-FFT cyclic prefix correlation is obtained. More specifically, $\{r_n\}$ can denote a received base band sample sequence sampled at a Nyquist rate, N can be a total number of sub-carriers, and m can be a length of a cyclic prefix in number of samples. A correlation metric $S_n$ can be computed at the aforementioned sample rate:

$$S_n = \sum_{j=n-(m-1)}^{n} r_j^* r_{j-N}.$$

From such correlation metric $S_n$, an initial estimate of OFDM symbol timing can be found utilizing the equation:

$$\hat{n} = arg_{n:n_0 \leq n < n_0 + N + m} |S_n|.$$

Figure 11:
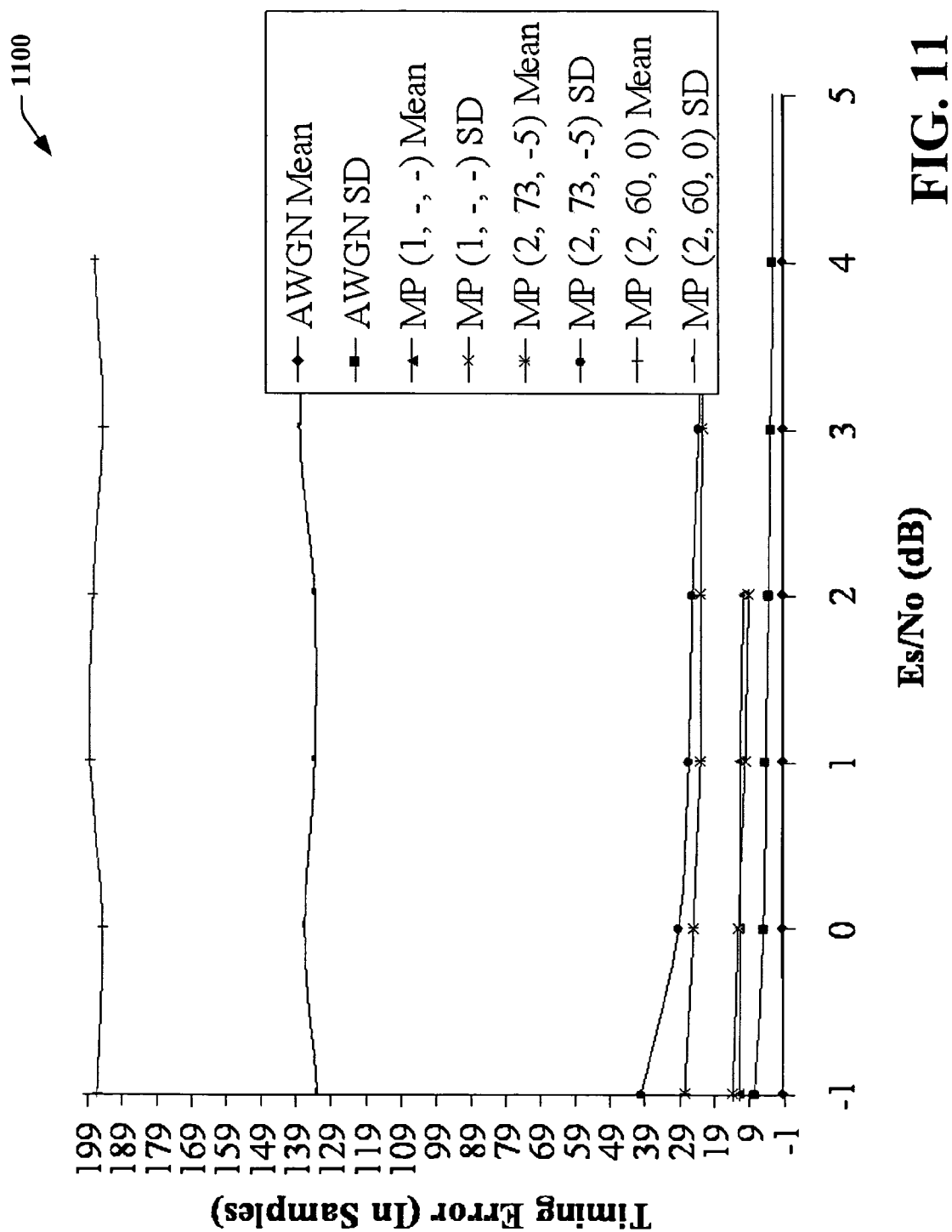
FIGS. 11-22 are graphs illustrating empirical data with respect to obtaining timing and frequency estimations of OFDM symbols.

Turning specifically to FIG. 11, it can be determined by analyzing a graph 1100 that utilizing this technique (noting a time of a peak energy level of the cyclic prefix correlation) results in unacceptably inaccurate timing errors in channels subject to severe multi-path effects where there are two-multi-path clusters originating from disparate cells and such clusters are associated with equal powers. Utilizing a fixed "back off" with the estimates shown in FIG. 11 also does not provide satisfactory performance for differing channel conditions.

Figure 12:
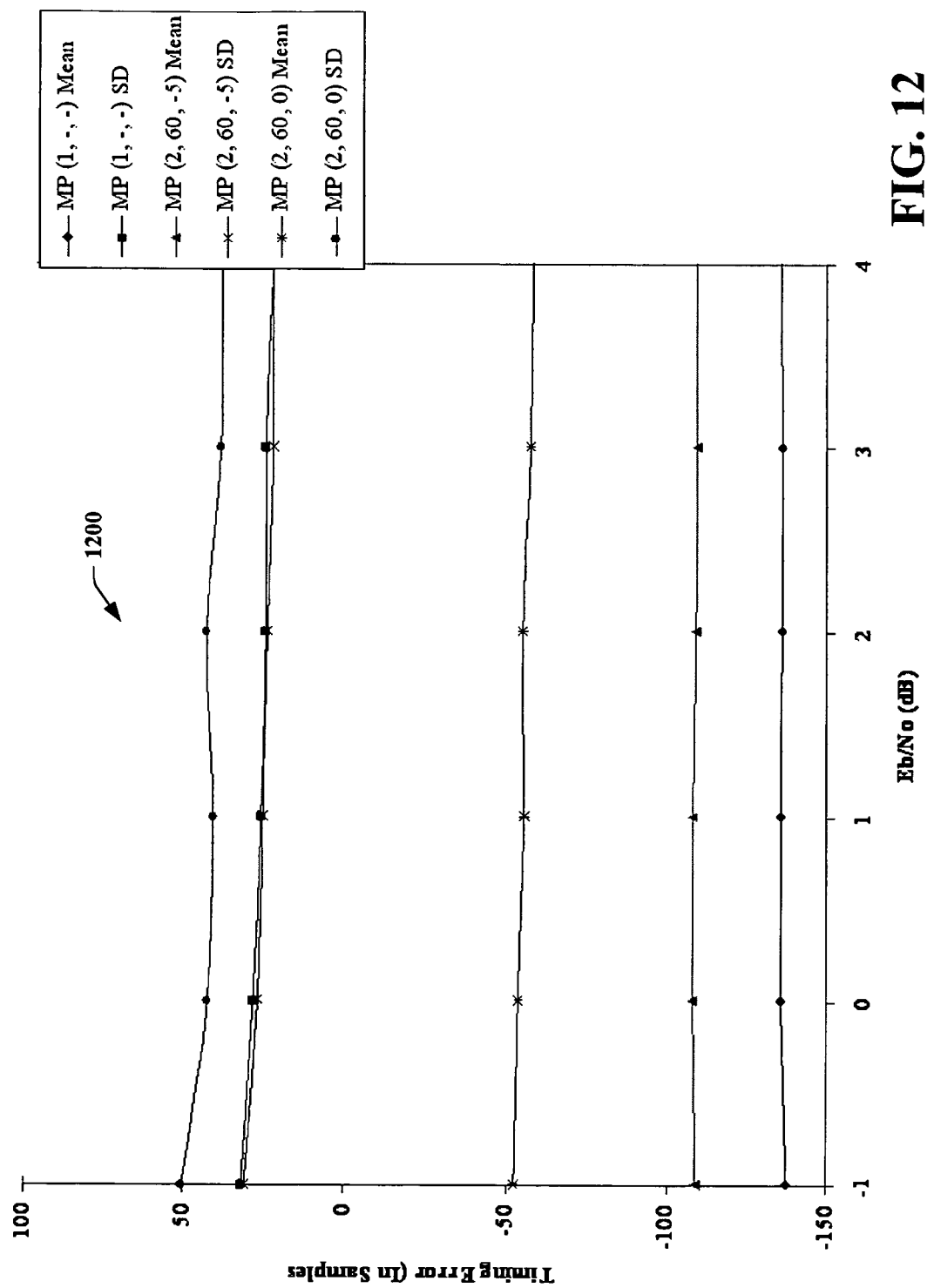

As described previously, OFDM symbol timing estimates can be improved by utilizing the estimate described above with respect to FIG. 11, and noting a magnitude of the peak energy (which can be denoted as P). A parameter t can be multiplied with the magnitude P, thus creating a threshold. The cyclic prefix correlation can then be traversed backwards in time until a first instance that the threshold tP intersects the cyclic prefix correlation (e.g., where an energy in the energy distribution is substantially similar to the threshold). Referring briefly to FIG. 12, performance of this technique in terms of estimation error mean and standard deviation for different multi-path channels is illustrated in a graph 1200, where t=0.72.

Figure 13:
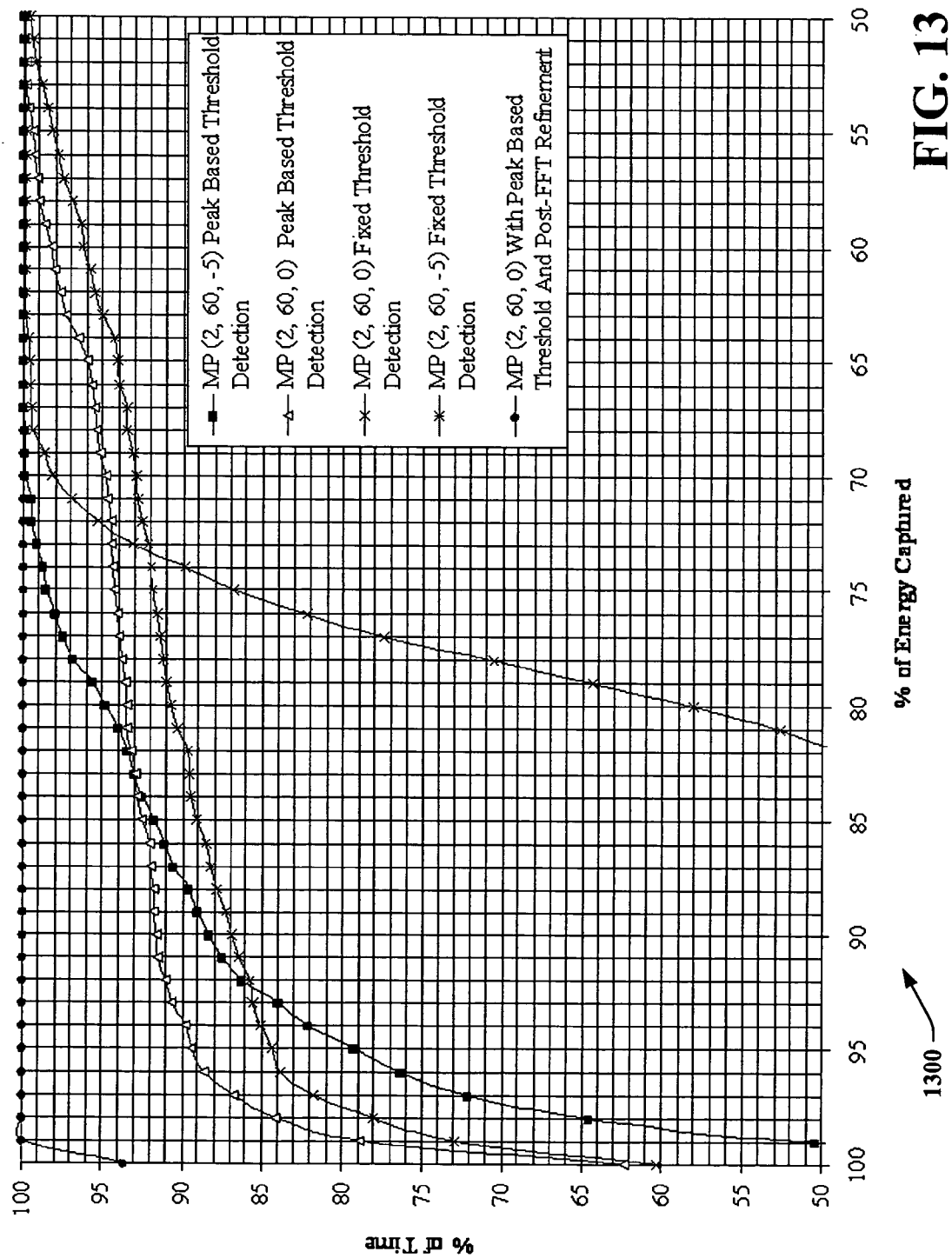

It can be determined that mean timing error can be altered by way of modifying a value of t. While modifying conventional systems and methodologies by utilizing an adaptive threshold (a magnitude of a cyclic prefix correlation multiplied by a parameter), timing error standard deviation remains too large to be acceptable as a fine timing result. A performance parameter directly related to modem performance is a percentage of energy captured within a FFT window. FIG. 13 illustrates a graph 1300 of a cumulative distribution function (CDF) of percentage energy captured.

A disparate scheme that can be employed to obtain a coarse timing estimate by utilizing a fixed threshold rather than a fixed back off. A coarse timing estimate is declared when $|S_n|$ exceeds the fixed threshold. In one embodiment, to enable a fixed threshold to operate desirably, the metric $|S_n|$ should be normalized utilizing, for example, the following equation:

$$NS_m = \frac{\sum_{j=n-(m-1)}^{n} r_j^* r_{j-N}}{\sum_{j=n-(m-1)}^{n} |r_j|^2}.$$

Figure 14:
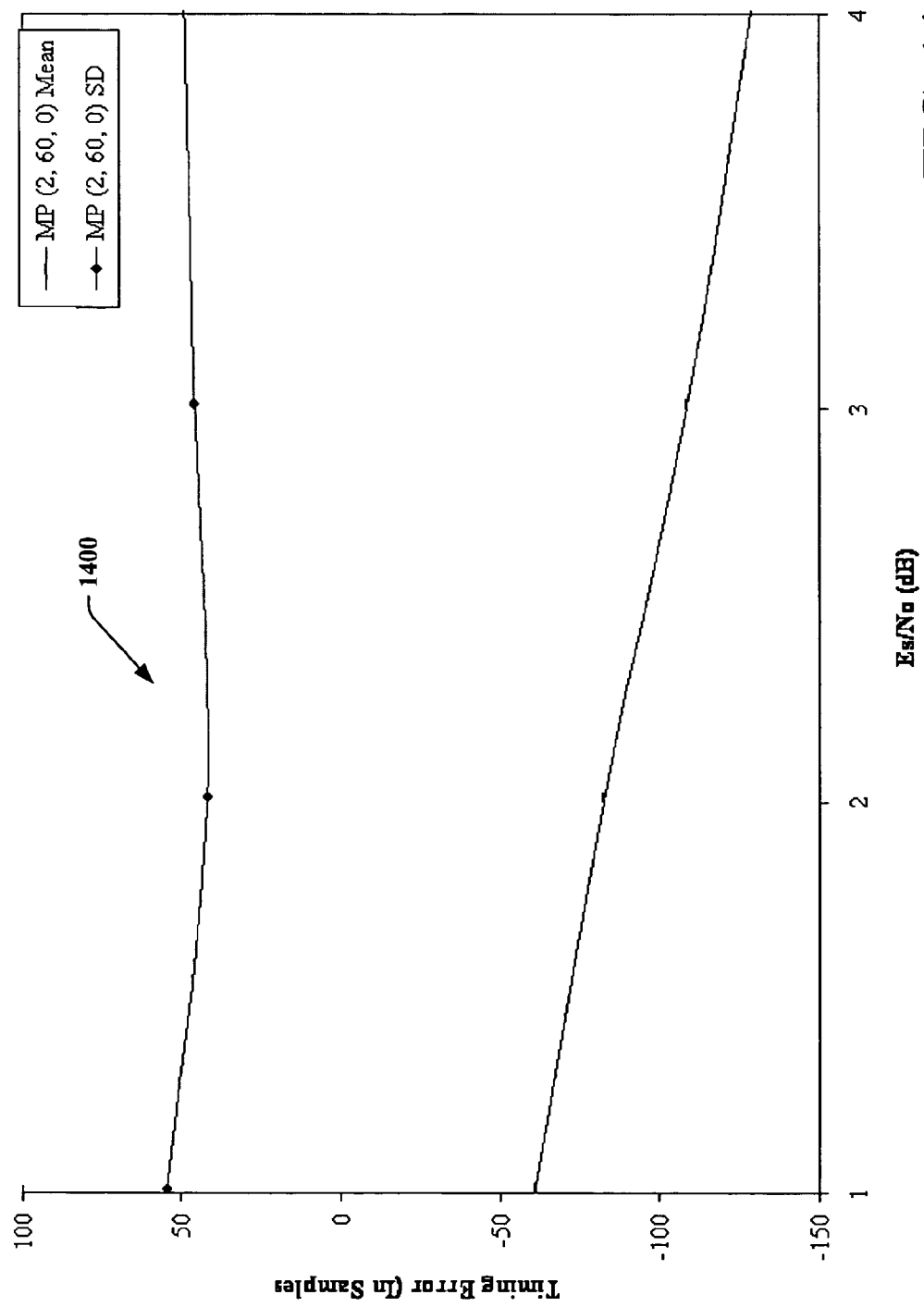
Figure 15:
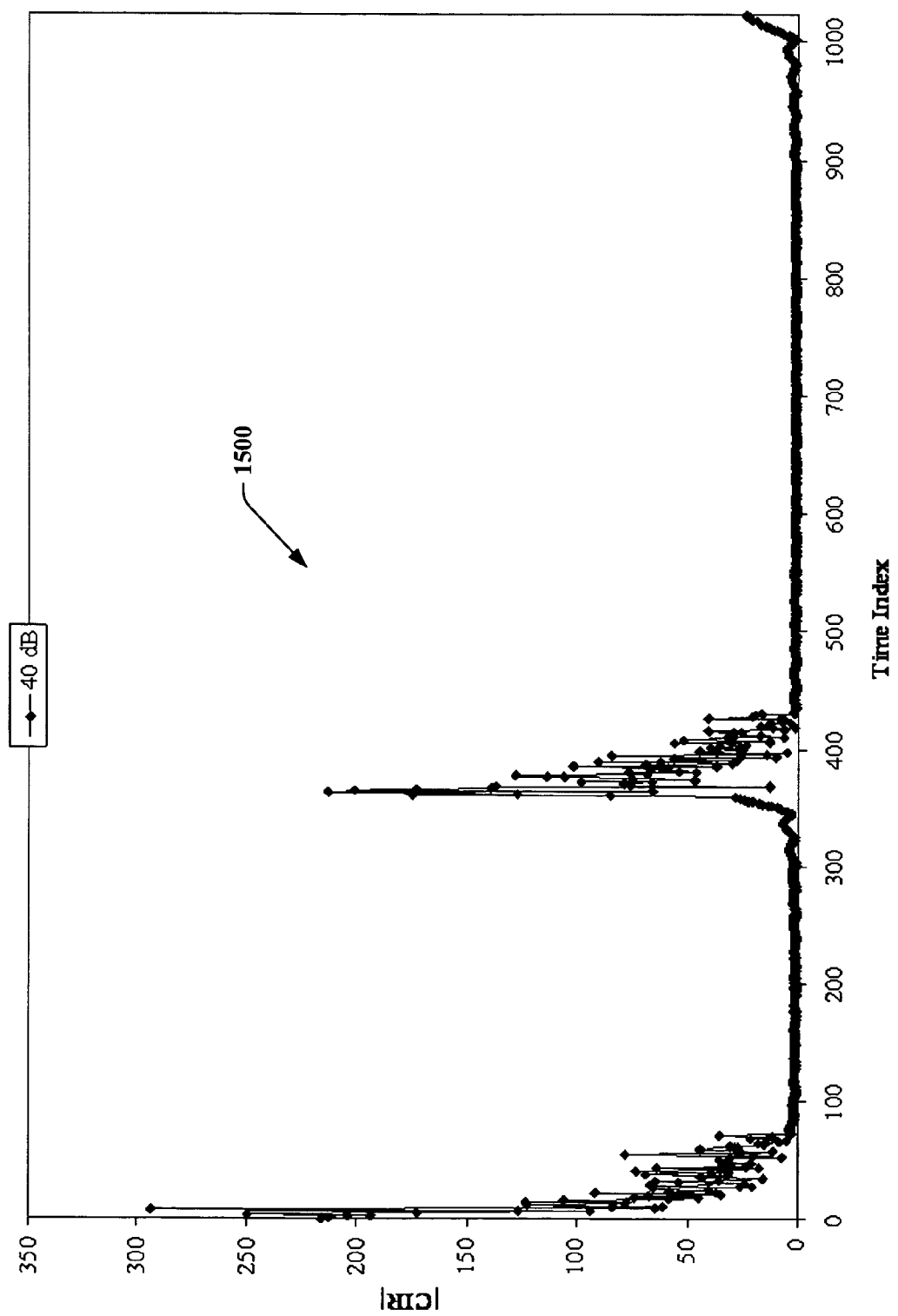
Figure 16:
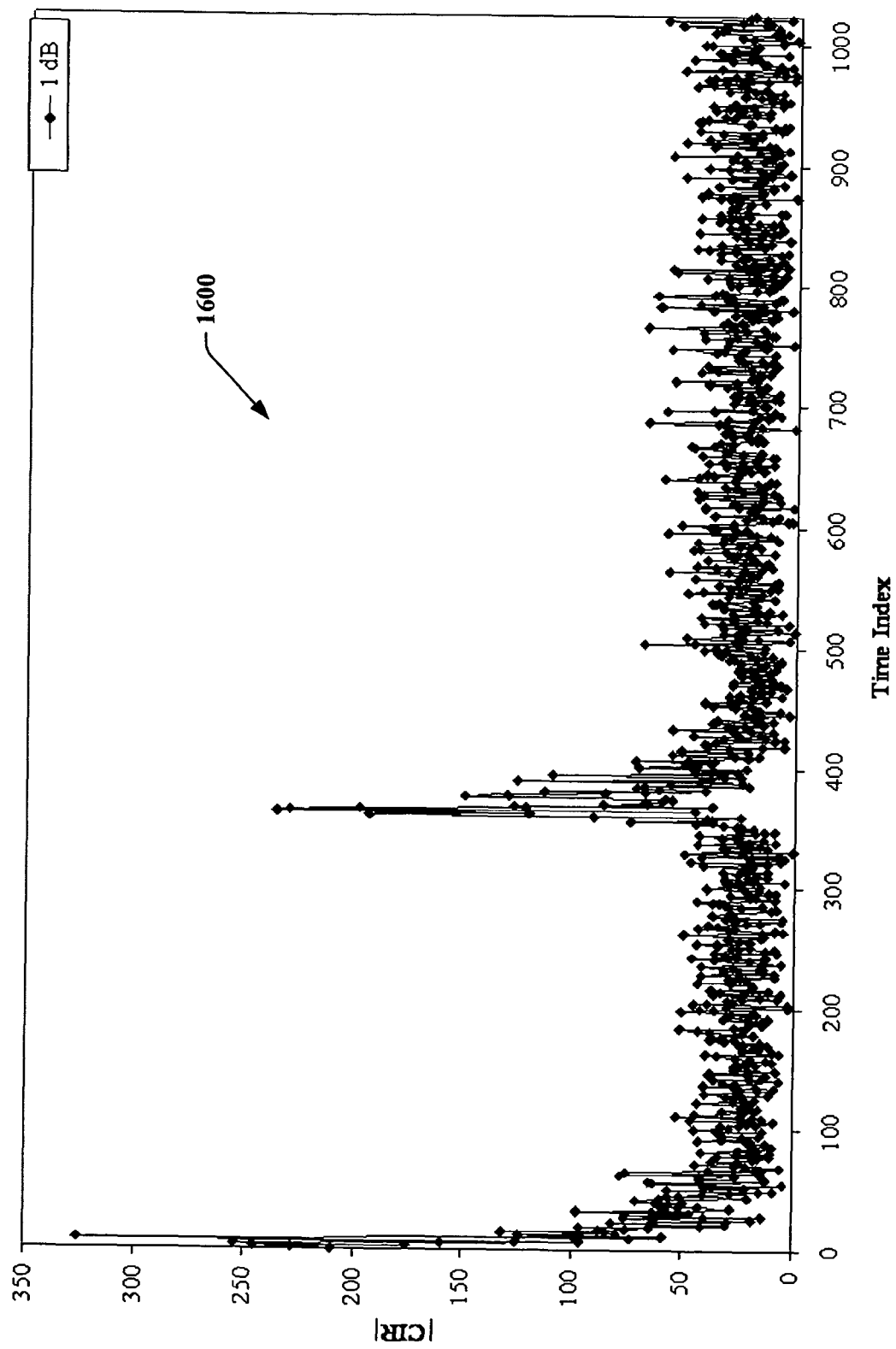
Figure 17:
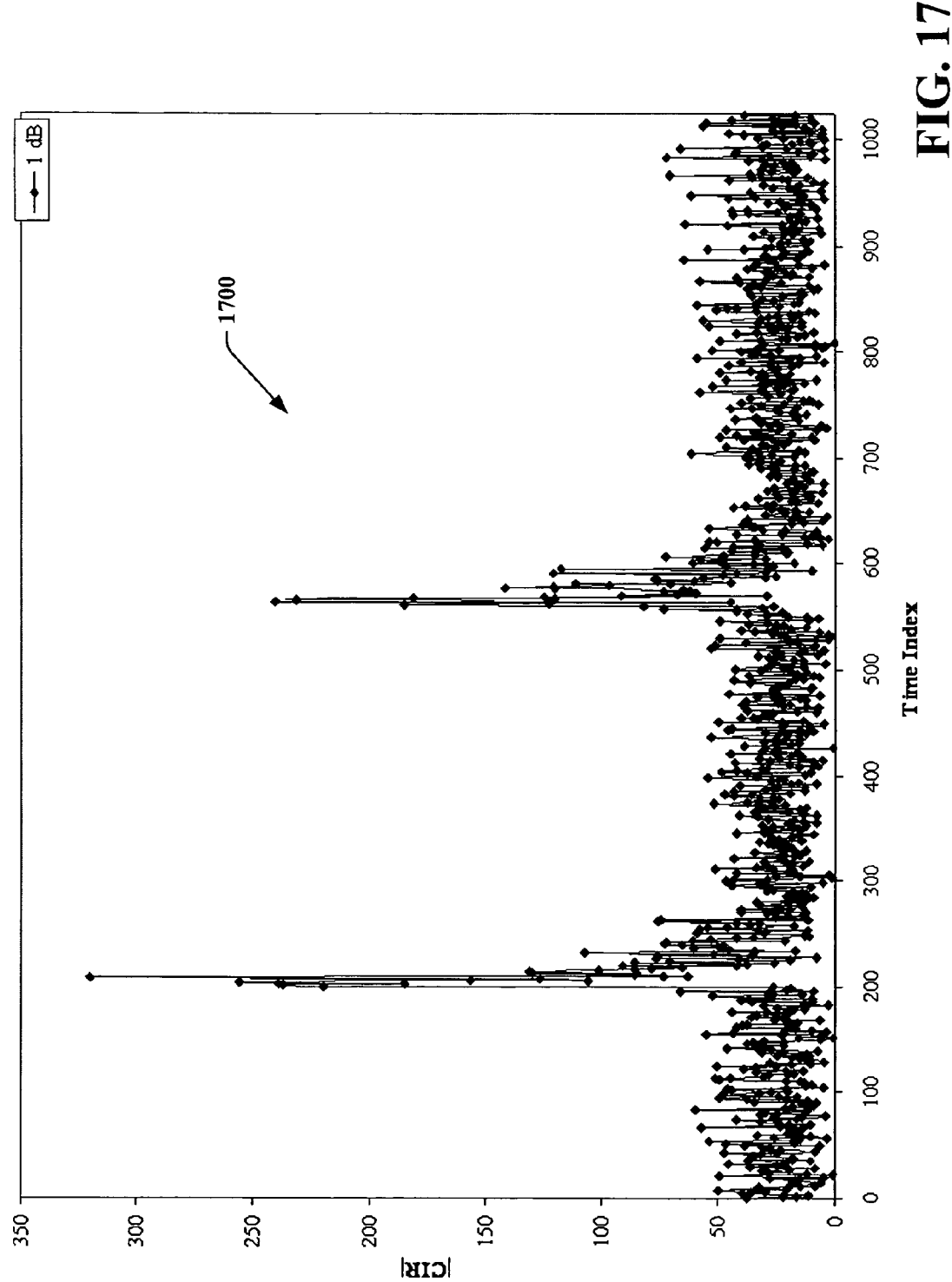
Figure 18:
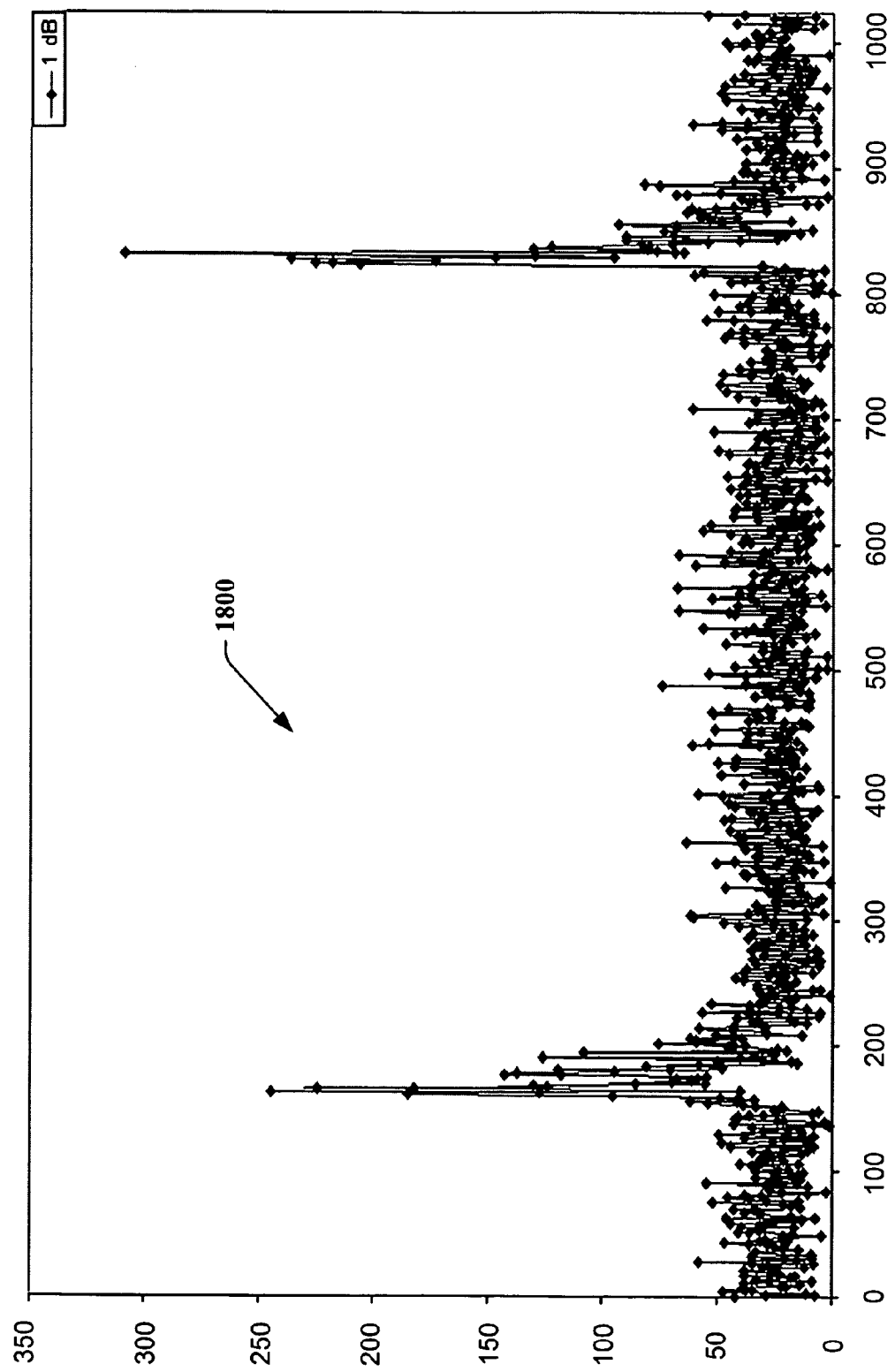

FIG. 14 is a graph 1400 illustrating timing error statistics for such a fixed threshold scheme.

Reviewing the graph 1300 (FIG. 13) of CDF of captured energy, it can be determined that a cyclic prefix correlation-based initial time estimate and subsequent refinement as a function of peak-derived back off does not provide sufficient time accuracy. Thus, in one exemplary embodiment, the initial time estimate can be further refined by employing a post-FFT technique. The following approach utilizes channel estimates, which implies that fine timing acquisition occurs after frequency and frame synchronization have been obtained. $\tilde{H}_{l,k}$ can denote channel estimates, where l represents an OFDM symbol index and k represents a sub-carrier bin index. A time domain channel impulse response (CIR) can be produced by utilizing an IFFT operation on $\tilde{H}_{l,k}$ and searching for a position of maximum CIR estimate(s) energy by employing a sliding window of length m (a length of the cyclic prefix). When the resultant CIR does not span an entirety of a cyclic prefix duration, a maximum can occur at multiple locations (all such locations provide valid FFT window starting position).

Figure 19:
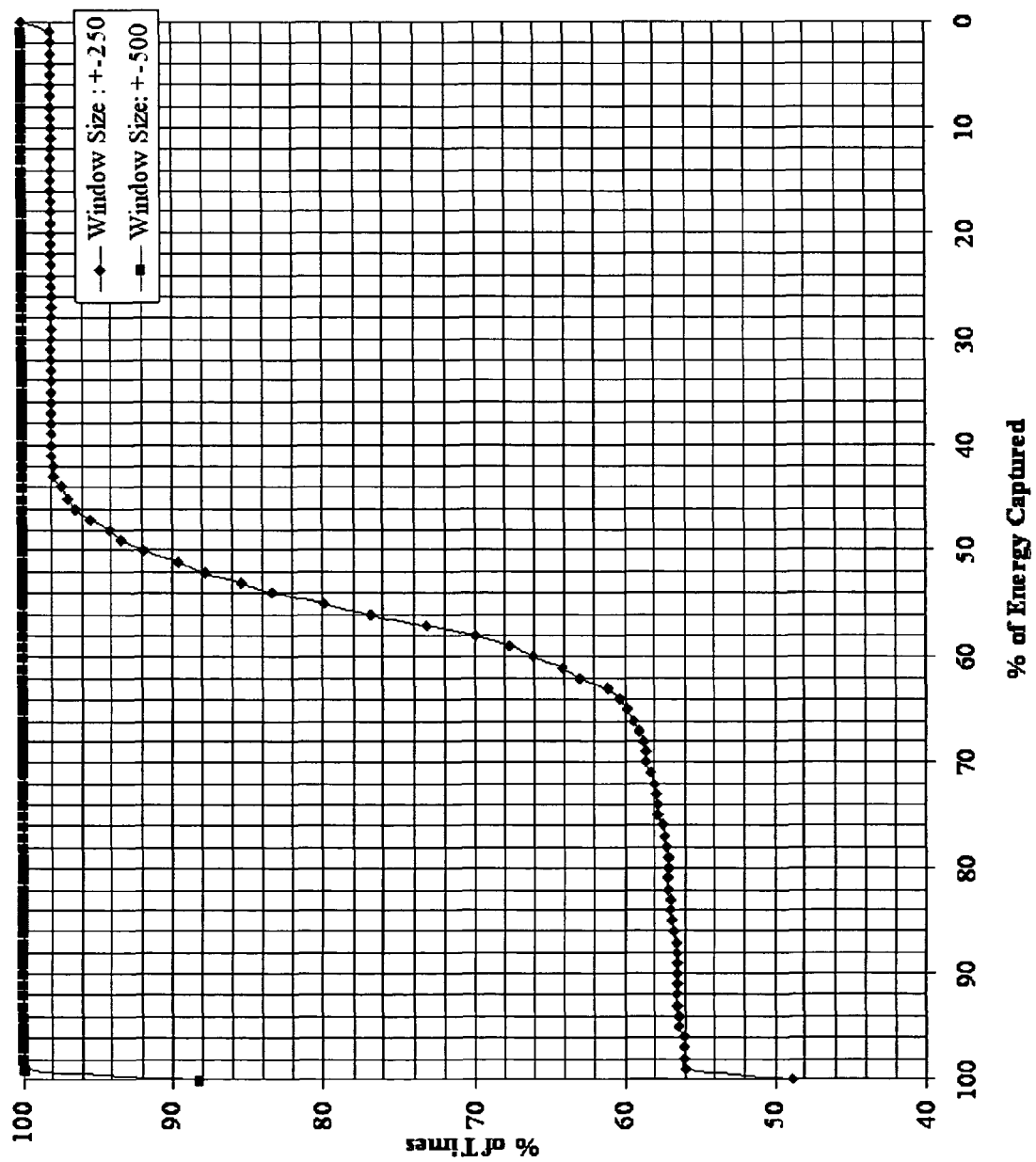

Referring now to FIGS. 15-18, disparate graphs 1500, 1600, 1700, and 1800 illustrate a cyclic shift of CIR resultant from timing error(s). To detect the cyclic shift unambiguously, a minimum IFFT size can be twice a span of the CIR. With respect to the graphs 1500, 1600, 1700, and 1800, an IFFT size is shown to be equal to twice the cyclic prefix duration, thereby implying that a total of 2m samples of $\tilde{H}_{l,k}$ may be needed. Furthermore, staggered pilots can be employed depending at least in part upon design specifications. Graphs 1500, 1600, 1700, and 1800 plot a 1024-point IFFT output assuming existence of 1024 samples of $\tilde{H}_{l,k}$, including an estimate of zeroes with respect to guard sub-carriers (guard tones). A channel illustrated in the aforementioned graphs consists of two exponential clusters separated by 60 micro seconds (360 samples), each with a root mean square (RMS) delay spread of 2.4 micro seconds. Graph 1300 (FIG. 13) illustrates estimation performance with the above-described post-FFT refinements. This post-FFT approach is so robust that if the post-FFT search window is of sufficient size, pre-FFT refinement is not necessary, and estimates simply utilizing a peak of a cyclic prefix correlation is sufficient. More particularly, FIG. 19 is a graph 1900 that shows timing acquisition using only peak-based initial estimate versus different sizes of post-FFT search window.

Figure 20:
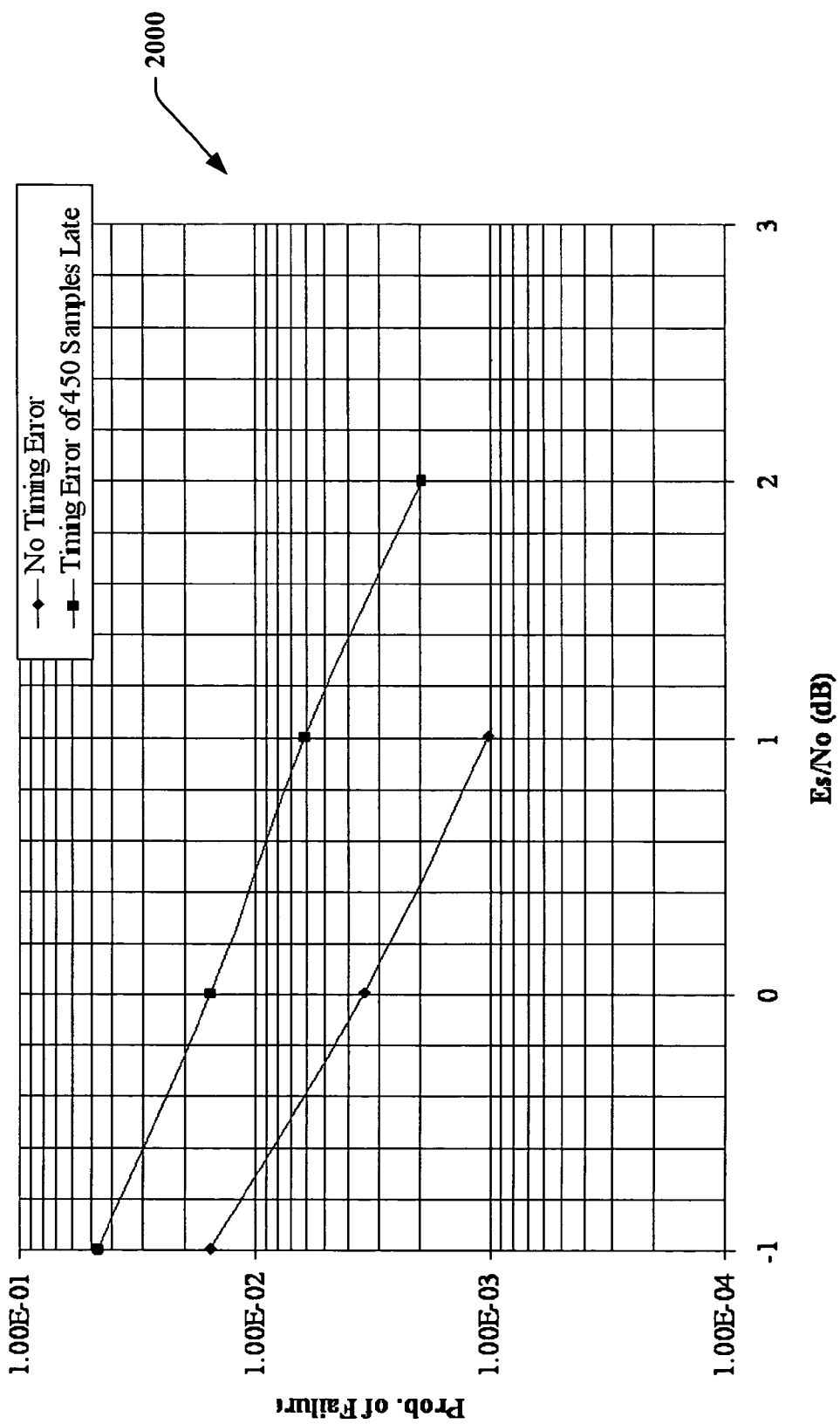

As integer frequency and frame acquisition occurs prior to channel estimates are available for post-FFT fine symbol timing synchronization, integer frequency and frame synchronization should be acquired with pre-FFT coarse timing described above. FIG. 20 is a graph 2000 that illustrates performance of integer frequency estimation with large initial timing error. Integer frequency estimation performance with large timing error can be improved by way of increasing a number of pilot symbols for estimation or observing multiple consecutive identical estimates or both.

Figure 21:
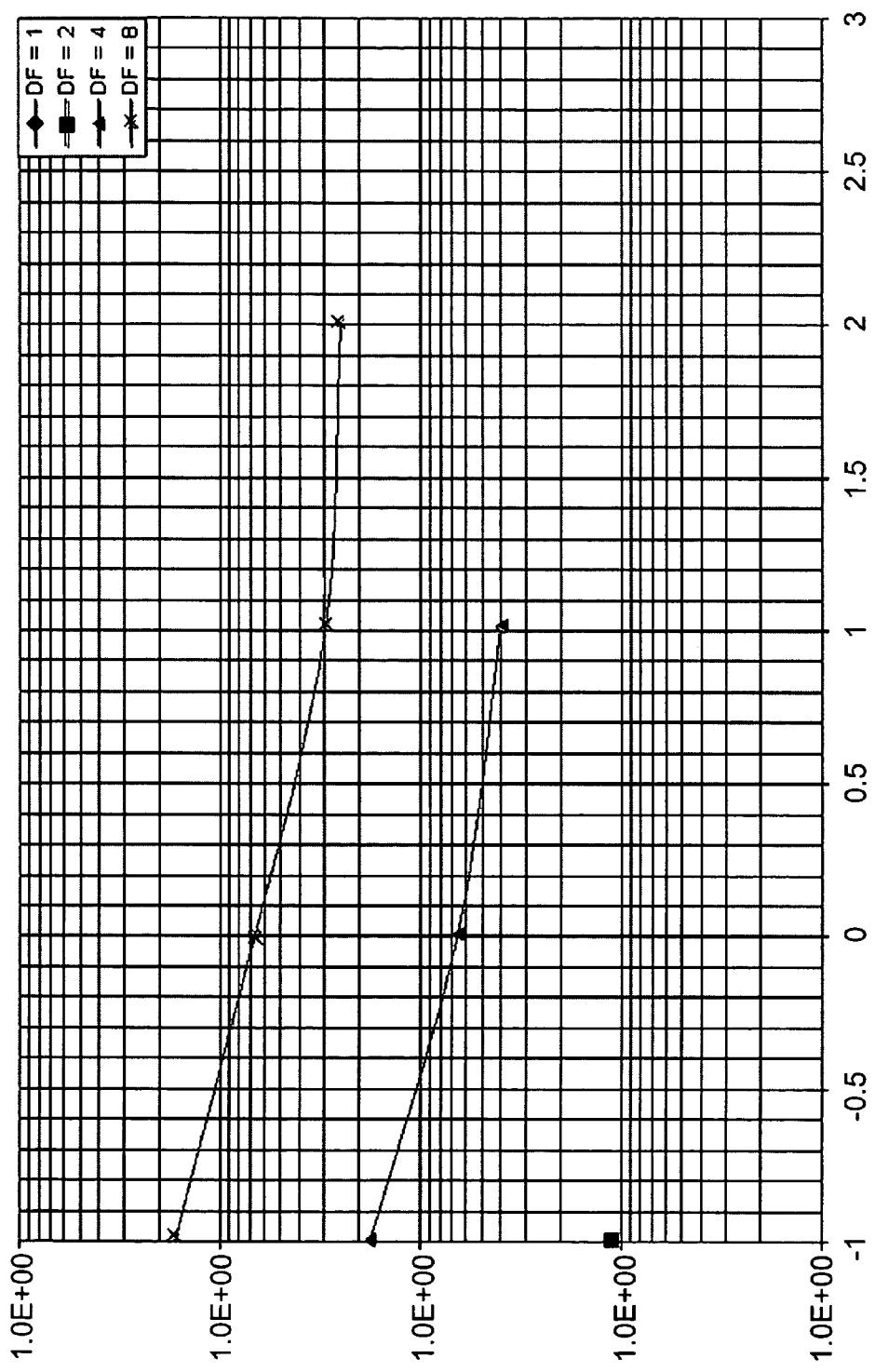
Figure 22:
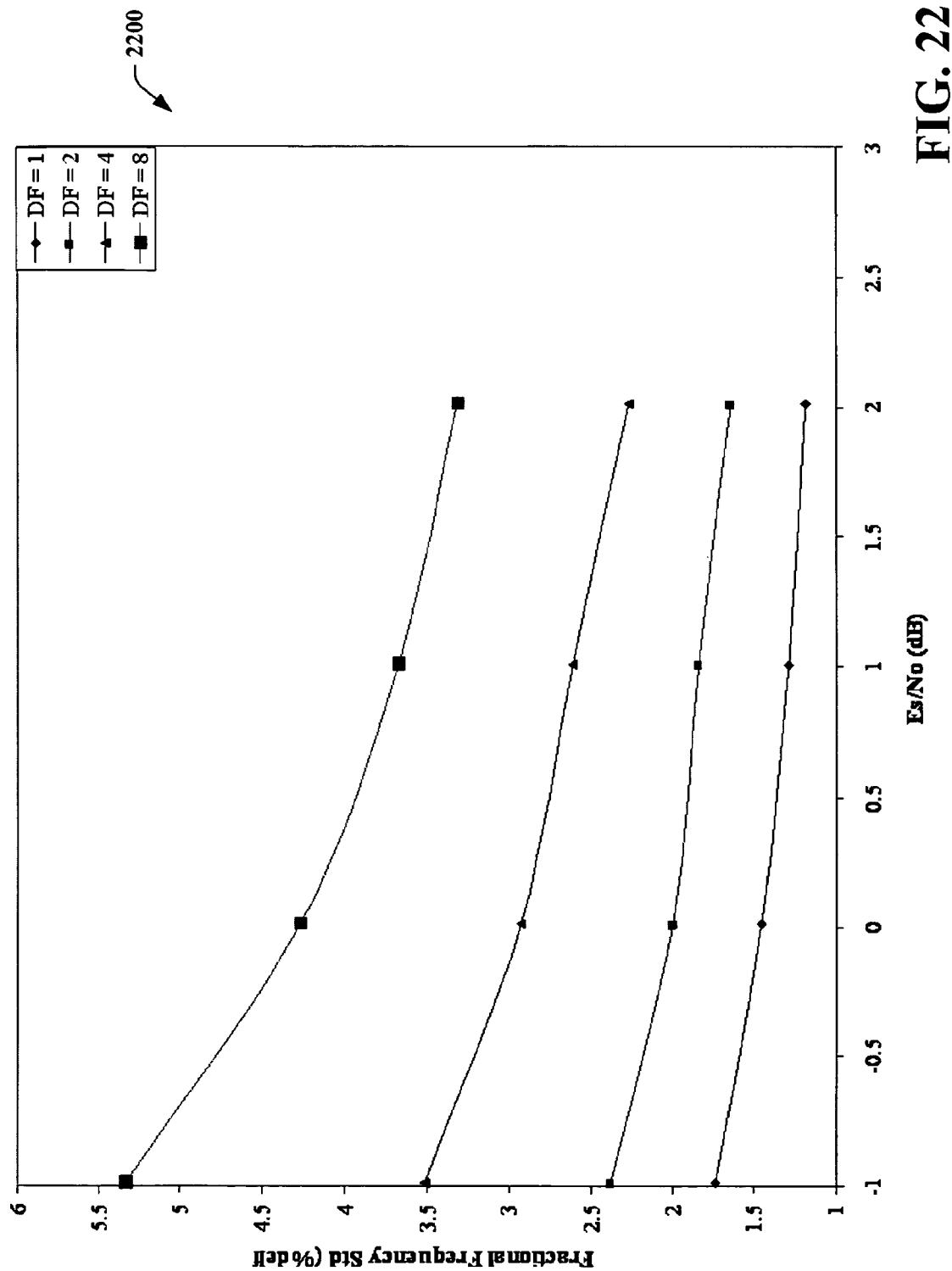

Performance of timing and fractional frequency acquisition is shown in FIG. 21 and FIG. 22 in graphs 2100 and 2200, respectively, for disparate decimation factors of input samples. When captured energy after a post-FFT refinement is less than 90%, a misdetection can be declared—in simulation, however, captured energy has found to be greater than 99% or zero. Captured energy is zero when the pre-FFT estimate is substantially large. Accordingly, it is important to employ the above-described adaptive back off technique to reduce pre-FFT estimate error. Specifically, graph 2100 (FIG. 21) illustrates timing acquisition performance given disparate decimation factors of input samples, and graph 2200 (FIG. 22) illustrates fractional frequency estimation performance given disparate decimation factors of input samples.

A time-frequency acquisition sequence follows utilizing pre-FFT and post-FFT refinements described above. At a first act, a maximum $|S_n|$ can be found, where $$n_0 < n < n_0 + \frac{N+m}{DF},$$

where $n_0$ is an initial time, N is an FFT length, m is a length of a cyclic prefix and DF is an input sample decimation factor. To generate $S_n$, a buffer of size N, a complex multiplier, a shift register of size m/DF, and an accumulator can be employed. A time corresponding to a maximum $|S_n|$ can be denoted as $\hat{n}$, and assume $n_0=0$, $$0 < \hat{n} < \frac{N+m}{DF}.$$

Thereafter, at a second act, $$\hat{n} < \frac{2m}{DF} \text{ or } \hat{n} > \frac{N+m-2m}{DF},$$

an initial search window can be shifted by N/2DF, and the first act can be repeated.

At a third act, a maximum $|S_n|$ can be located twice within consecutive windows of length $$\frac{N+m}{DF}$$

samples. If locations of the second and third peaks are within $$\frac{N+m \pm 2m}{DF} \text{ and } \frac{2(N+m) \pm 2m}{DF}$$

samples, respectively, from the first peak, then initial FFT window timing can be declared as acquired. A location of the $3^{rd}$ peak can be taken as an initial time estimate. A sliding window integration can be performed by adding a latest product term while subtracting an oldest term in a shift register from an accumulator. A maximum can be obtained by comparing a magnitude of $S_n$ sequentially over a span of $$\frac{N+m}{DF}$$

samples. At a fourth act, a cyclic prefix correlation can be performed on non-decimated samples and estimate a fractional frequency offset. For all subsequent OFDM symbols, apply this frequency correction starting from a beginning of a new symbol At a fifth act, integer frequency offsets can be estimated utilizing FFT outputs from two consecutive OFDM symbols. At a sixth act, integer frequency offsets can again be estimated from two consecutive OFDM symbols. If this estimate is substantially similar to an estimate obtained in the fifth act, integer frequency can be declared as acquired. Integer frequency correction can be applied pre-FFT for subsequent OFDM symbols, initiating from a beginning of a new symbol. If the estimate of the sixth act is not substantially similar to the estimate of the fifth act, the fifth act can be revisited. At a seventh act, frame synchronization can be acquired. At an eight act, carrier channel estimates can be obtained from staggered pilots from two consecutive OFDM symbols. Thereafter, a 2m point IFFT can be undertaken, and symbol timing can be estimated and applied to a pre-FFT window for subsequent OFDM symbols. Thereafter, OFDM symbol timing can be declared as acquired.

On a subsequent wake-up, channel delay profile may have significantly been altered, and a carrier frequency may have substantially drifted (but drifted less than $\pm\Delta f/2$ where $\Delta f$ is an inter-carrier spacing). Accordingly, OFDM symbol timing and fractional frequency should be re-acquired. As the pre-FFT timing is coarse, it may be beneficial to not utilize such timing—timing correction can be completed by employing a post-FFT technique.

At a first act, cyclic prefix correlation can be performed on non-decimated samples, and fractional frequency offset can be estimated. For subsequent OFDM symbols apply such frequency correction at a beginning of a new symbol. At act 2, symbol timing from two consecutive OFDM symbols can be estimated and applied to a pre-FFT window for subsequent OFDM symbols. Therefore, three OFDM symbols can be employed to re-acquire time and frequency offset on wake up. Another OFDM symbol can be utilized to enable post-FFT sampling frequency and carrier frequency loops to converge.

Figure 23:
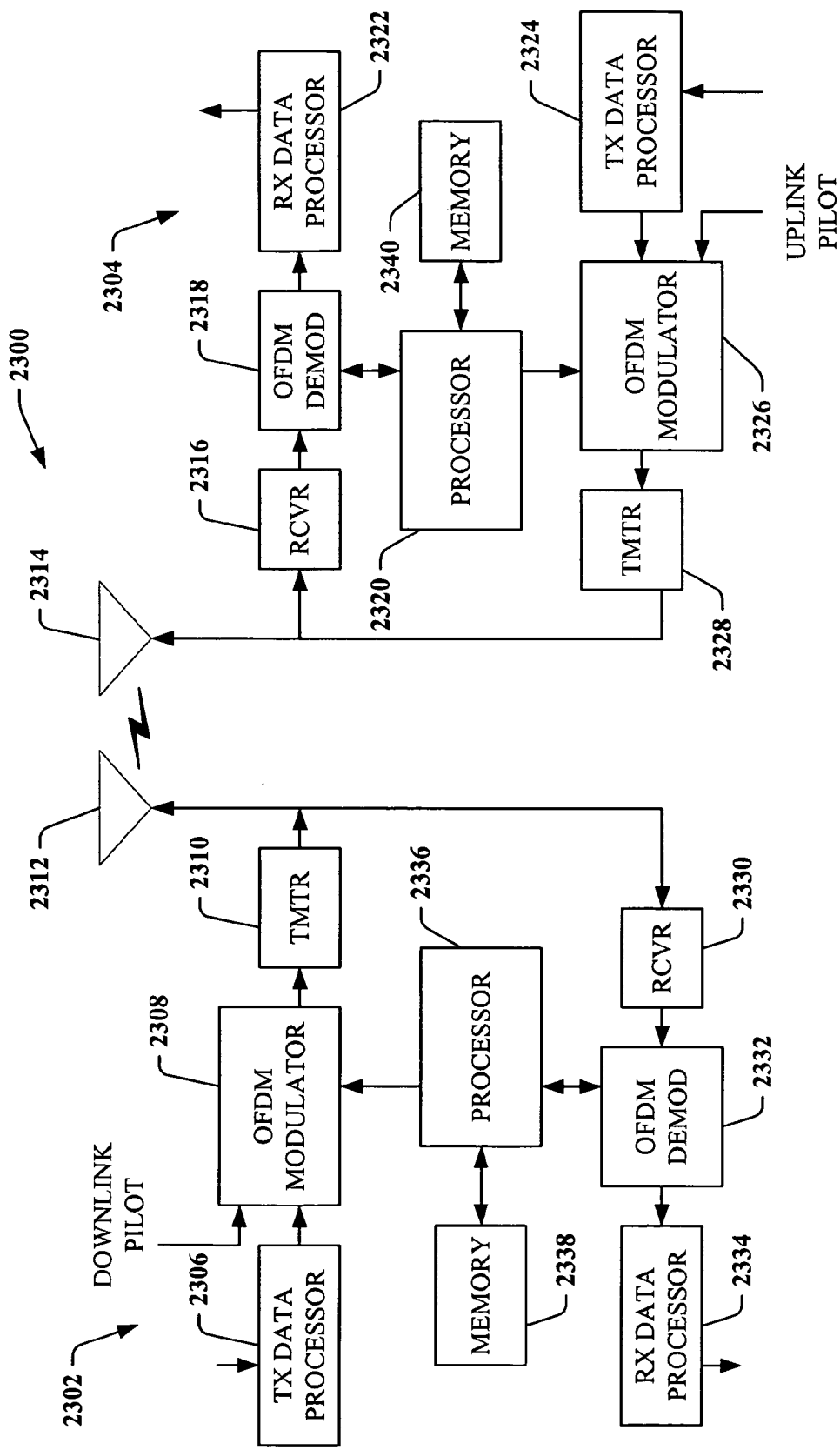
FIG. 23 is an exemplary communication system that can operate in a wireless environment.

Referring now to FIG. 23, a block diagram 2300 that includes an access point 2302 and a terminal 2304 in a spectrally shaped wireless system is illustrated. On a downlink, at access point 2302 a transmit (TX) processor 2306 receives, formats, codes, interleaves, and modulates (e.g., symbol maps) traffic data and provides modulation symbols (e.g., data symbols). An OFDM modulator 2308 receives and processes the data symbols and pilot symbols and provides a stream of OFDM symbols. OFDM modulator 2308 multiplexes data and pilot symbols on proper sub-carriers, can provide a signal value of zero for unused sub-carriers, and can obtain a set of N transmit symbols for N sub-carriers for each OFDM symbol period. The transmit symbols can be data symbols, pilot symbols, signal values of zero, and any other suitable data symbol. For example, pilot symbols can be delivered over active pilot sub-carriers, and pilot symbols can be delivered continuously in each OFDM symbol period. In a disparate embodiment, pilot symbols can be time division multiplexed (TDM) with the data symbols on a substantially similar sub-carrier. The OFDM modulator 2308 can repeat a portion of each transformed symbol to obtain a corresponding OFDM symbol. This repeated is known as a cyclic prefix and can be employed to combat delay spread in a wireless channel.

A transmitter unit 2310 can receive and convert a stream of OFDM symbols into one or more analog symbols to generate a downlink signal suitable for transmission over a wireless channel. This downlink signal can then be transmitted by way of an antenna 2312 to a plurality of terminals, including the terminal 2304. An antenna 2314 associated with the terminal 2304 receives the downlink signal and provides a received signal to a receiver unit (RCVR) 2316, which conditions (e.g., filters, amplifies, and frequency downconverts) the received signal and digitizes the conditioned signal to acquire samples. An OFDM demodulator 2318 can employ an IFFT operation to obtain OFDM symbols in a time domain, remove the cyclic prefix appended to the OFDM symbols, transform the received transformed symbols to the frequency domain using an N-point FFT, obtain N received symbols for the N sub-carriers for each OFDM symbol period, and provide receive pilot symbols to a processor 2320 for channel estimation. The OFDM demodulator 2318 can further receive frequency response estimates for the downlink from the processor 2320, perform data demodulation on the received data symbols to acquire data symbol estimates (e.g., estimates of transmitted data symbols), and provide data symbol estimates to an RX data processor 2322. The RX data processor 2322 demodulates (e.g., symbol demaps), deinterleaves, and decodes data symbol estimates to recover transmitted traffic data. Processing undertaken by the OFDM demodulator 2318 and the RX data processor 2322 is complimentary to processing undertaken by the OFDM modulator 2308 and TX data processor 2306, respectively, at access point 2302.

The processor 2320 obtains the received pilot symbols from active pilot sub-carriers and performs channel estimation. The processor 2320 can be utilized in connection with extrapolating and/or interpolating as desired to obtain channel gain estimates for $P_{dn}$ uniformly spaced sub-carriers, were $P_{dn}$ is a number of pilot sub-carriers for a downlink, deriving a least square impulse response estimate for the downlink, performing tap selection for disparate taps of the impulse response estimate, and deriving a final frequency response estimate for N sub-carriers for the downlink. On the uplink, a TX data processor 2324 can process traffic data and provide data symbols. An OFDM modulator 2326 can receive and multiplex data symbols with pilot symbols, perform OFDM modulation, and provide a stream of OFDM symbols. The pilot symbols can be transmitted on $P_{up}$ sub-carriers that have been assigned to the terminal 2304 for pilot transmission, where a number of pilot sub-carriers ($P_{up}$) for the uplink can be substantially similar to or substantially disparate from a number of pilot sub-carriers ($P_{dn}$) for the downlink. A transmitter unit 2328 can thereafter receive and process a stream of OFDM symbols to generate an uplink signal, which can be transmitted by way of the antenna 2314 to the access point 2302.

The uplink signal from the terminal 2304 can be received by the antenna 2312 and processed by a receiver unit 2330 to obtain samples. An OFDM demodulator 2332 can process the samples and provide received pilot symbols and data symbol estimates for the uplink. An RX data processor 2334 can process the data symbol estimates to recover traffic data transmitted by the terminal 2304. A processor 2336 can perform channel estimation for each active terminal transmitting on the uplink. Multiple terminals can transmit pilot symbols concurrently on the uplink on respective assigned sets of pilot sub-carriers, where the pilot sub-carriers sets can be interlaces. For each terminal, the processor 2336 can perform extrapolation and/or interpolation as needed for the terminal, obtain an initial frequency response estimate for the uplink for the terminal 2304, derive a least square channel impulse response estimate for the terminal, perform tap selection, and obtain a final frequency response for the terminal 2304. A frequency response estimate for each terminal can be provided to the OFDM demodulator 2332 and utilized for data demodulation for that terminal. The processors 2336 and 2320 can direct operation at the access point 2302 and the terminal 2304, respectively. Memory units 2338 and 2340 can be employed to store programs and/or code and data utilized by the processors 2336 and 2320. The processors 2336 and 2320 can also be utilized to perform various computations to derive frequency and impulse response estimates for the uplink and downlink, respectively.

For multiple-access OFDM systems (e.g., an orthogonal frequency division multiples access (OFDMA) systems), multiple terminals can transmit concurrently on the uplink. For OFDMA and similar systems, pilot sub-carriers can be shared amongst disparate terminals. This pilot sub-carrier structure can be desirable to obtain frequency diversity for differing terminals. The channel estimation techniques described herein can be implemented through various means/devices. For example, hardware, software, or a combination thereof can be employed to obtain a channel estimation in accordance with one or more aforementioned embodiments. For example, the processing units employed for channel estimation purposes can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or any other suitable device/unit or a combination thereof. With respect to software, a channel estimation in accordance with one or more previously described embodiments can be obtained at least in part through use of modules (e.g., procedures, functions, . . . ) that perform one or more functions described herein. Software can be stored in memory, such as the memory units 2338 and 2340 and executed by one or more processors, such as the processors 2336 and 2320. Memory units can be implemented within processor(s) or can exist external thereto, and communication lines/techniques facilitating either configuration are contemplated and intended to fall under the scope of the hereto-appended claims. While the above describes access points and terminals that can be utilized in OFDM and OFDMA systems, it is understood that access points and terminals utilized in connection with other wireless protocols (e.g., CDMA, TDMA, . . . ) are contemplated and intended to fall under the scope of the hereto-appended claims.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. In a method for adaptively generating an estimate for a location of a boundary of a symbol with respect to time in a wireless network where channels are associated with various noise and subject to multi-path effect, the improvement of obtaining an energy peak corresponding to an improved coarse estimation of a boundary between symbols in said network, comprising:
   a) receiving a symbol;
   b) performing a correlation with respect to the symbol;
   c) determining a peak energy with respect to the correlation;
   d) determining a magnitude value with respect to the located peak energy;
   e) determining an adaptive threshold for the symbol by multiplying the magnitude of the peak energy with a parameter, the parameter being dependent upon at least one channel condition;
   f) comparing the threshold with the correlation;
   g) determining an instance in time before the energy peak that the threshold is substantially similar to an energy within the correlation;
   h) utilizing the instance in time as the coarse timing estimate.

2. The method of claim 1, further comprising employing an analysis component to adaptively determine a parameter utilized to determine the threshold.

3. The method of claim 1, further comprising setting a value of a parameter utilized to determine the threshold between 0.5 and 1.

4. The method of claim 1, further comprising employing machine learning techniques to generate inferences that can be employed in connection with determining a parameter utilized to determine the threshold.

5. The method of claim 1, further comprising defining a window of time that the estimate falls within.

6. The method of claim 5, further comprising defining the window of time as a function of estimated channel conditions.

7. The method of claim 5, further comprising employing machine learning techniques to generate inferences that can be employed in connection with determining a size of the window of time.

8. The method of claim 5, further comprising employing an analysis component that adaptively defines a size of the window of time.

9. The method of claim 1, further comprising utilizing post-FFT techniques in connection with the estimate to obtain a more precise estimate.

10. The method of claim 1 wherein said method is performed by a subscriber station.

11. The method of claim 1, further comprising defining an output of the correlation by the following algorithm:

$$S_n = \sum_{j=n-(m-1)}^{n} r_j^* r_{j-N},$$

where $S_n$ is a correlation metric, $\{r_n\}$ is a received base sample sequence sampled at a Nyquist rate, N is a total number of sub-carriers, and m is a length of a cyclic prefix in number of samples.

12. The method of claim 11, further comprising determining the peak energy by employment of the following algorithm: $\hat{n} = \arg_{n:n_0 \leq n \leq n_0+N+m} |S_n|$, where $\hat{n}$ is a location of a sample in time that resides at the peak.

13. The method of claim 1, further comprising determining a threshold that is compared with the correlation and determining the estimate as a function of the comparison.

14. The method of claim 13, further comprising altering the threshold if a desirable estimate is not determined.

15. The method of claim 1, wherein the symbol is employed in one or more of an OFDM environment, an OFDMA environment, a CDMA environment, a TDMA environment, and a GSM environment.

16. The method of claim 1, wherein the correlation is a cyclic prefix correlation.

17. In a system that facilitates adaptively obtaining a coarse estimation of a boundary of a symbol with respect to time, in a wireless network where channels are associated with various noise and subject to multi-path effects, the improvement of obtaining an energy peak corresponding to an improved coarse estimation of a boundary between symbols in said network, comprising:
a peak detector that detects a peak energy of an energy distribution output by a correlator;
an estimating component that adaptively estimates a boundary of the symbol as a function of a magnitude of the detected peak energy; and
a component that generates a parameter that is utilized by the estimating component together with the magnitude of the peak energy to facilitate estimating the boundary, the parameter being dependent upon at least one channel condition;
wherein the estimating component receives the parameter and multiplies the parameter by the magnitude of the peak energy of the symbol to create an adaptive threshold value and wherein the estimating component compares the energy distribution with the threshold and determines a position in time before the energy peak that the threshold is substantially similar to an energy level within the energy distribution.

18. The system of claim 17, wherein the correlator is one of a cross-correlator, a delay correlator, and an autocorrelator.

19. The system of claim 17, further comprising a window component that defines an allowable window of time that can be utilized in connection with estimating the boundary of the symbol.

20. The system of claim 19, further comprising a sizing component that determines a size of the allowable window of time as a function of estimated channel conditions.

21. The system of claim 19, further comprising an analysis component that adaptively determines a size of the allowable window of time.

22. The system of claim 19, further comprising a machine learning component that generates inferences relating to an allowable size of the window as a function of historical channel conditions and contextual information.

23. The system of claim 17, wherein, a value of the parameter is a function of estimated channel conditions.

24. The system of claim 17, further comprising a machine learning component that generates inferences relating to a value of the parameter as a function of historical channel conditions and contextual information.

25. The system of claim 17, wherein the correlator determines the peak energy by summing a cyclic prefix that comprises a plurality of samples with substantially similar samples existent at a disparate edge of an OFDM symbol and taking an absolute value of a square of the summation.

26. The system of claim 17 wherein the system is employed in a channel subject to multi-path effects.

27. The system of claim 17, wherein the correlator employs cyclic prefix correlation to generate the energy distribution.

28. A subscriber station comprising the system of claim 17.

29. The system of claim 17, wherein the correlator generates the energy distribution by executing the following algorithm:

$$S_n = \sum_{j=n-(m-1)}^{n} r_j^* r_{j-N}$$

wherein,
$S_n$ is a correlation metric,
$\{r_n\}$ is a received base sample sequence sampled at a Nyquist rate,
N is a total number of sub-carriers, and
m is a length of a cyclic prefix in number of samples.

30. The system of claim 29, wherein the peak detector detects the peak energy by way of employment of the following algorithm:

$$\hat{n} = arg_{n:n_0 \leq n \leq n_0+N+m} |S_n|,$$

wherein $\hat{n}$ is a location of a sample in time that resides at the peak energy.

31. The system of claim 17, further comprising a threshold generator that determines a threshold that is compared with energy distribution, the threshold determined as a function of the magnitude of the peak energy.

32. The system of claim 31, the threshold generator modifies the threshold if a coarse estimation is not located within a pre-defined time window.

33. The system of claim 32, the threshold generator includes an analysis component that alters the threshold by applying an algorithm that modifies a parameter that is multiplied with the magnitude of the peak energy.

34. The system of claim 17, the energy distribution output by the correlator is indicative of similarities within the symbol.

35. The system of claim 17, further comprising a component that facilitates determining a more precise timing estimate as a function of the coarse timing estimate.

36. The system of claim 17, the symbol is employed in one or more of an OFDM environment, an OFDMA environment, a CDMA environment, a TDMA environment, and a GSM environment.

37. The system of claim 17, wherein the at least one channel condition comprises a noise condition.

38. The system of claim 17, wherein the correlator is a cyclic prefix correlator.

39. In a wireless network system for coarsely estimating a boundary of a symbol with respect to time, the improvement of means to detect an energy peak corresponding to an improved coarse estimation of a boundary between symbols in said network, comprising:
means for determining a correlation between one or more of samples within a symbol and samples within a plurality of symbols;
means for determining an adaptive threshold value as a function of the magnitude of the peak energy;
means for multiplying the magnitude of the peak energy with a parameter to determine the adaptive threshold, the parameter being dependent upon at least one channel condition;
means for comparing the threshold with the correlation; and means for determining an instance in time before the energy peak that the threshold is substantially similar to an energy within the correlation; and means for coarsely estimating the boundary of the symbol in time as a function of determining the instance in time.

40. The system of claim 39, further comprising means for ensuring that the estimated boundary lies within a defined window of time.

41. The system of claim 40, further comprising means for utilizing the coarse estimate to generate a more precise estimate.

42. The system of claim 39, further comprising means for adaptively determining a parameter utilized to determine the threshold.

43. The system of claim 42, further comprising means for defining a value of the parameter between 0.5 and 1.

44. The system of claim 42, further comprising means for generating inferences that can be employed in connection with determining the parameter.

45. The system of claim 39, further comprising means for defining a window of time that the estimate falls within.

46. The system of claim 45, further comprising defining the window of time as a function of estimated channel noise.

47. The system of claim 45, further comprising means for generating inferences that can be employed in connection with determining a size of the window of time.

48. The system of claim 39, further comprising means for employing post-FFT techniques in connection with the estimate to obtain a more precise estimate.

49. The system of claim 39, further comprising means for employing the estimate in connection with a channel subject to multi-path effects.

50. The system of claim 49, further comprising means for determining the peak energy by employment of the following algorithm:

$$\hat{n} = \arg_{n: n_0 \leq n \leq n_0 + N + m} |S_n|,$$

wherein $\hat{n}$ is a location of a sample in time that resides at the peak.

51. The system of claim 39, further comprising means for defining an output of the correlation by the following algorithm:

$$S_n = \sum_{j=n-(m-1)}^{n} r_j^* r_{j-N}$$

wherein
   $S_n$ is a correlation metric,
   $\{r_n\}$ is a received base sample sequence sampled at a Nyquist rate,
   N is a total number of sub-carriers, and
   m is a length of a cyclic prefix in number of samples.

52. The system of claim 39, further comprising means for determining a threshold that is compared with the correlation and determining the estimate as a function of the comparison.

53. The system of claim 52, further comprising means for modifying the threshold if a desirable estimate is not determined.

54. The system of claim 39, wherein the symbol is employed in one or more of an OFDM environment, an OFDMA environment, a CDMA environment, a TDMA environment, and a GSM environment.

55. The system of claim 39, the correlation is a cyclic prefix correlation.

56. The system of claim 39, means for determining the correlation by utilizing one or more of a cross-correlator, a delay correlator, and an autocorrelator.

57. In a non-transient computer-readable medium having computer-executable instructions for generating an estimate for a location of a boundary of a symbol with respect to time, where channels are associated with various noise and subject to multi-path effect, the improvement of:
   receiving an energy distribution representative of a correlation with respect to one or more wireless symbols;
   determining a peak energy of the energy distribution;
   defining a parameter;
   multiplying the parameter with the magnitude of the peak to generate an adaptive threshold, the parameter being dependent upon at least one channel condition; and
   determining a coarse estimate of a boundary of the symbol in time obtained as a function of the adaptive threshold by comparing the threshold with the correlation and determining an instance in time before the energy peak that the threshold is substantially similar to an energy within the correlation.

58. The non-transient computer-readable medium of claim 57, further comprising computer-executable instructions for defining an allowable window of time in which the coarse estimate can lie.

59. The non-transient computer-readable medium of claim 58, further comprising computer-executable instructions for:
   estimating channel noise; and
   defining the allowable window of time as a function of the estimated channel noise.

60. The non-transient computer-readable medium of claim 57, further comprising computer-executable instructions for altering the threshold if the coarse estimate is not within an allowable timeframe.

61. The non-transient computer-readable medium of claim 57, further comprising computer-executable instructions for employing machine learning in connection with generating the coarse estimate.

62. In a microprocessor that executes instructions for determining a boundary of a wireless symbol in time in a wireless network where channels are associated with various noise and subject to multi-path effect, the improvement of means for obtaining an energy peak corresponding to an improved coarse estimation of a boundary between symbols in said network, comprising:
   means for performing a correlation of samples within one or more symbols to determine an energy distribution;
   means for determining an adaptive threshold value as a function of the magnitude of the peak energy by multiplying the magnitude of the peak energy with a parameter to determine an adaptive threshold, the parameter being dependent upon at least one channel condition;
   means for comparing the threshold with the correlation;
   means for determining an instance in time before the energy peak that the threshold is substantially similar to an energy within the correlation; and
   means for coarsely estimating the boundary of the symbol in time as a function of determining the instance in time.

* * * * *